(12) United States Patent
Jeong et al.

(10) Patent No.: US 12,495,157 B2
(45) Date of Patent: *Dec. 9, 2025

(54) VIDEO ENCODING DEVICE AND VIDEO DECODING DEVICE USING HIGH-PRECISION SKIP ENCODING AND METHOD THEREOF

(71) Applicant: SAMSUNG ELECTRONICS CO., LTD., Suwon-si (KR)

(72) Inventors: Seung-soo Jeong, Seoul (KR); Min-woo Park, Yongin-si (KR); Jin-Young Lee, Suwon-si (KR); Sun-il Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,884

(22) Filed: Jun. 4, 2024

(65) Prior Publication Data

US 2024/0323430 A1   Sep. 26, 2024

Related U.S. Application Data

(63) Continuation of application No. 17/959,855, filed on Oct. 4, 2022, now Pat. No. 12,052,435, which is a
(Continued)

(51) Int. Cl.
*H04N 19/52* (2014.01)
*H04N 19/176* (2014.01)

(52) U.S. Cl.
CPC ........... *H04N 19/52* (2014.11); *H04N 19/176* (2014.11)

(58) Field of Classification Search
CPC ..... H04N 19/59; H04N 19/577; H04N 19/463
See application file for complete search history.

(56) References Cited

U.S. PATENT DOCUMENTS

| 8,848,805 B2 | 9/2014 | Sugio et al. |
| 8,976,867 B2 | 3/2015 | Nakamura et al. |

(Continued)

FOREIGN PATENT DOCUMENTS

| CN | 103563386 A | 2/2012 |
| CN | 102870414 A | 1/2013 |

(Continued)

OTHER PUBLICATIONS

Communication dated Dec. 12, 2023, issued by the India Intellectual Property Office in Indian Patent Application No. 201727014814.
(Continued)

*Primary Examiner* — Tsion B Owens
(74) *Attorney, Agent, or Firm* — Sughrue Mion, PLLC

(57) ABSTRACT

Provided is a video decoding method performed by a video decoding apparatus, the video decoding method including: determining prediction mode information of a current block and an index indicating a prediction candidate, from a bitstream; determining a prediction candidate list according to the prediction mode information; when the prediction mode information of the current block indicates a pre-set prediction mode, determining a motion vector indicated by the index indicating the prediction candidate from the prediction candidate list, and determining a prediction motion vector of the current block based on at least one of pieces of motion prediction information related to the motion vector; and determining a motion vector of the current block based on the prediction motion vector, wherein the pre-set prediction mode is a prediction mode different from a skip mode and a merge mode.

3 Claims, 26 Drawing Sheets

Related U.S. Application Data continuation of application No. 17/218,808, filed on Mar. 31, 2021, now Pat. No. 11,509,926, which is a continuation of application No. 16/776,053, filed on Jan. 29, 2020, now Pat. No. 10,992,951, which is a continuation of application No. 15/522,526, filed as application No. PCT/KR2015/011665 on Nov. 2, 2015, now Pat. No. 10,602,179.

(60) Provisional application No. 62/073,317, filed on Oct. 31, 2014.

(56) References Cited

U.S. PATENT DOCUMENTS

| | | | |
|---|---|---|---|
| 9,148,671 B2 | 9/2015 | Park | |
| 9,282,338 B2 | 3/2016 | Zheng et al. | |
| 9,432,680 B2 | 8/2016 | Lee | |
| 9,549,198 B2 | 1/2017 | Oh et al. | |
| 9,729,873 B2 | 8/2017 | Wang et al. | |
| 9,800,873 B2 | 10/2017 | Nishitani et al. | |
| 9,807,413 B2 | 10/2017 | Nakamura et al. | |
| 9,843,820 B2 | 12/2017 | Lin et al. | |
| 9,936,202 B2 | 4/2018 | Park et al. | |
| 10,397,597 B2 | 8/2019 | Boon et al. | |
| 10,939,119 B2 | 3/2021 | Lim et al. | |
| 11,375,223 B2* | 6/2022 | Choi | H04N 19/597 |
| 2009/0022220 A1* | 1/2009 | Vatis | H04N 19/117 |
| | | | 375/240.12 |
| 2011/0170601 A1 | 7/2011 | Kim et al. | |
| 2011/0286520 A1 | 11/2011 | Xu et al. | |
| 2012/0008676 A1* | 1/2012 | Lee | H04N 19/96 |
| | | | 375/E7.125 |
| 2013/0170553 A1 | 7/2013 | Chen et al. | |
| 2013/0188720 A1 | 7/2013 | Wang et al. | |
| 2013/0243088 A1 | 9/2013 | Lim et al. | |
| 2014/0146876 A1 | 5/2014 | Takehara et al. | |
| 2014/0153647 A1 | 6/2014 | Nakamura et al. | |
| 2014/0161186 A1 | 6/2014 | Zhang et al. | |
| 2014/0241436 A1 | 8/2014 | Laroche et al. | |
| 2014/0254686 A1 | 9/2014 | Lim et al. | |
| 2014/0286395 A1 | 9/2014 | Lee et al. | |
| 2014/0286414 A1* | 9/2014 | Nakamura | H04N 19/105 |
| | | | 375/240.12 |
| 2014/0286430 A1 | 9/2014 | Lee et al. | |
| 2014/0286431 A1 | 9/2014 | Lee et al. | |
| 2014/0376638 A1* | 12/2014 | Nakamura | H04N 19/159 |
| | | | 375/240.16 |
| 2015/0103911 A1* | 4/2015 | Lee | H04N 19/91 |
| | | | 375/240.15 |
| 2016/0073133 A1 | 3/2016 | Lee et al. | |
| 2016/0227233 A1* | 8/2016 | Cho | H04N 19/44 |
| 2022/0078477 A1 | 3/2022 | Lim et al. | |
| 2024/0323430 A1* | 9/2024 | Jeong | H04N 19/176 |

FOREIGN PATENT DOCUMENTS

| | | |
|---|---|---|
| CN | 103039076 A | 4/2013 |
| CN | 103155563 A | 6/2013 |
| CN | 103270755 A | 8/2013 |
| CN | 103609120 A | 2/2014 |
| CN | 103765896 A | 4/2014 |
| CN | 103907346 A | 7/2014 |
| CN | 104041048 A | 9/2014 |
| EP | 2725800 A2 | 4/2014 |
| EP | 2924996 B1 | 12/2018 |
| EP | 3435675 B1 | 10/2019 |
| JP | 2014501091 A | 1/2014 |
| JP | 2014-107708 A | 6/2014 |
| JP | 2014-520484 A | 8/2014 |
| JP | 2014-523184 A | 9/2014 |
| KR | 10-2013-0045153 A | 5/2013 |
| KR | 10-2014-0026580 A | 3/2014 |
| KR | 10-2014-0051026 A | 4/2014 |
| WO | 2012/081949 A2 | 6/2012 |
| WO | 2012081879 A | 6/2012 |
| WO | 2013053309 A1 | 4/2013 |
| WO | 2013/077659 A1 | 5/2013 |
| WO | 2014/171769 A1 | 10/2014 |

OTHER PUBLICATIONS

Communication dated Mar. 3, 2020 from the Japanese Patent Office in application No. 2017-523512.
Communication issued Apr. 19, 2022 by the Japanese Patent Office in counterpart Japanese Patent Application No. 2020-165943.
Communication issued Sep. 8, 2021 by the European Patent Office in European Patent Application No. 15855245.5.
Communication dated Jul. 12, 2023 issued by the Chinese Patent Office in counterpart Chinese Application No. 202010959189.2.
Communication dated Aug. 28, 2019 issued by the State Intellectual Property Office of P.R. China in counterpart Chinese Application No. 201580072015.1.
Communication dated Sep. 18, 2017, from the European Patent Office in counterpart European Application No. 15855245.5.
Communication dated Jul. 18, 2023 issued by the Chinese Patent Office in counterpart Chinese Application No. 202010959210.9.
Communication dated Nov. 28, 2023, issued by the Japan Patent Office in counterpart Japanese Patent Application No. 2023-015924.
Communication dated Feb. 15, 2021, issued by the India Intellectual Property Office in Indian Patent Application No. 201727014814.
Communication dated Sep. 21, 2021 issued by the Japanese Intellectual Property Office in counterpart Japanese Application No. 2020-165943.
Communication dated Jul. 17, 2023 issued by the Chinese Patent Office in counterpart Chinese Application No. 202010959206.2.
Communication dated Oct. 23, 2019 issued by the Japanese Intellectual Property Office in counterpart Japanese Application No. 2017-523512.
Communication dated Feb. 15, 2021, from the Intellectual Property Office of India in Application No. 201727014814.
Communication dated Jul. 18, 2023 issued by the Chinese Patent Office in counterpart Chinese Application No. 202010959562.4.
Search Report and Written Opinion issued Feb. 24, 2016 by the International Searching Authority in counterpart International Application No. PCT/KR2015/011665 (PCT/ISA/210/220/237).
Guillaume Laroche et al. "RD Optimized Coding for Motion Vector Predictor Selection", IEEE Transactions on Circuits and Systems for Video Technology, vol. 18, No. 9, Sep. 2008, (pp. 1247-1257).
T. Wiegand et al., "Overview of the H.264/ AVC Video Coding Standard", IEEE Transactions on Circuits and Systems for Video Technology, vol. 13, No. 7, Jul. 2003, pp. 560-576.
G. Sullivan et al., "Overview of the High Efficiency Video Coding (HEVC) Standard", IEEE Transactions on Circuits and Systems for Video Technology, vol. 22, No. 12, Dec. 2012, pp. 1649-1668.
"Recommendation ITU-T H.265—High efficiency video coding", Series H: Audiovisual and Multimedia Systems Infrastructure of audiovisual services—Coding of moving, ITU-T, Telecommunication Standardization Sector of ITU, H.265, Apr. 2013, 317 total pages, XP055206562.
Tammy Lee et al., "CE13: Merge candidates list construction", Joint Collaborative Team on Video Coding (JCT-VC) of ITU-T SG16 WP3 and ISO/IEC JTC1/SC29/WG11, 7th Meeting: Geneva, CH, Nov. 21-30, 2011, (5 pages total).
Communication dated Aug. 5, 2024, issued by the European Patent Office in European Application No. 15855245.5.
Extended European Search Report dated Oct. 7, 2024, issued by the European Patent Office in European Application No. 24186361.2.
Office Action issued on Apr. 15, 2025 by the Japanese Patent Office in corresponding JP Patent Application No. 2024-065857.

* cited by examiner

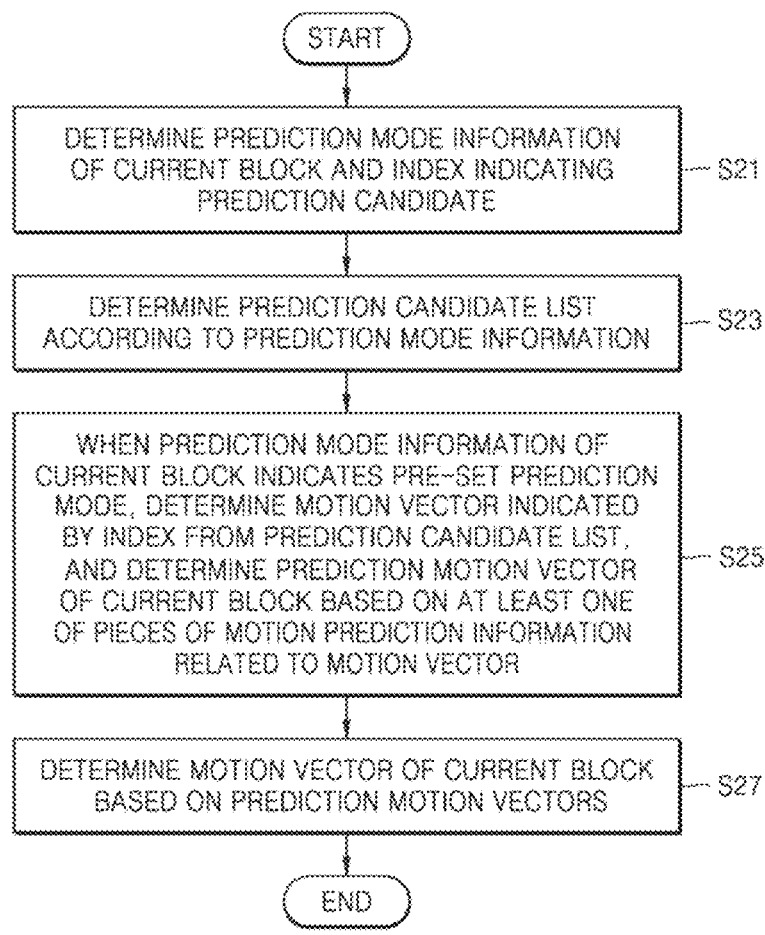

| IDX0 | IDX1 | IDX2 | IDX3 | IDX4 |
|---|---|---|---|---|
| 0 | 10 | 110 | 1110 | 1111 |

| IDX0 | IDX1 | IDX2 | IDX3 | IDX4 | IDX5 (=New Mode) |
|---|---|---|---|---|---|
| 0 | 10 | 110 | 1110 | 11110 | 11111 |

FIG. 7

|       |      |                 | ADAPTIVE | CTX model | 0 | 1 |                              |
|-------|------|-----------------|----------|-----------|---|---|------------------------------|
| NIDX0 | 0    | Precision Step 0 | 0       |           | 0 | IDX0 (x+1,y), (x-1,y)            |
|       |      |                 |          |           | 1 | IDX0 (x,y+1), (x,y-1)            |
|       |      | Precision Step 1 | 10      |           | 0 | IDX0 (x+2,y), (x-2,y)            |
|       |      |                 |          |           | 1 | IDX0 (x,y+2), (x,y-2)            |
|       |      | ...             |          |           |   |                              |
|       |      | Precision Step 7 | 1111111 |           | 0 | IDX0 (x+128,y), (x-128,y)        |
|       |      |                 |          |           | 1 | IDX0 (x,y+128), (x,y-128)        |

NIDX1   10
NIDX2   110
NIDX3   1110
NIDX4   1111

VIDEO ENCODING DEVICE AND VIDEO DECODING DEVICE USING HIGH-PRECISION SKIP ENCODING AND METHOD THEREOF

CROSS REFERENCE TO RELATED APPLICATIONS

This application is continuation of U.S. application Ser. No. 17/959,855 filed Oct. 4, 2022, which is a continuation of U.S. application Ser. No. 17/218,808 filed Mar. 31, 2021, which is now U.S. Pat. No. 11,509,926 issued on Nov. 22, 2022, which is a continuation of U.S. patent application Ser. No. 16/776,053, filed Jan. 29, 2020, which is now issued U.S. Pat. No. 10,992,951 issued on Apr. 27, 2021, which is a continuation of U.S. patent application Ser. No. 15/522,526, filed on Apr. 27, 2017, which is now U.S. Pat. No. 10,602,179 issued on Mar. 24, 2020, which is a National Stage Entry of International Application No. PCT/KR2015/011665, filed on Nov. 2, 2015, which claims priority from U.S. Provisional Patent Application No. 62/073,317, filed on Oct. 31, 2014, in the U.S. Patent and Trademark Office, the contents of which are incorporated herein by reference in their entireties.

TECHNICAL FIELD

The present disclosure relates to a video encoding apparatus and a video decoding apparatus.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

DETAILED DESCRIPTION OF THE INVENTION

Technical Problem

Provided are a video encoding method and a video decoding method, which search for various prediction motion vector candidates by using a motion vector, and improve compressibility by reducing bit representation.

Technical Solution

According to an aspect of an embodiment, a video decoding method performed by a video decoding apparatus, the video decoding method includes: determining prediction mode information of a current block and an index indicating a prediction candidate, from a bitstream; determining a prediction candidate list according to the prediction mode information; when the prediction mode information of the current block indicates a pre-set prediction mode, determining a motion vector indicated by the index indicating the prediction candidate from the prediction candidate list, and determining a prediction motion vector of the current block based on at least one of pieces of motion prediction information related to the motion vector; and determining a motion vector of the current block based on the prediction motion vector, wherein the pre-set prediction mode is a prediction mode different from a skip mode and a merge mode.

Advantageous Effects of the Invention

Provided are a video encoding method and a video decoding method, which search for various prediction motion vector candidates by using a motion vector, and improve compressibility by reducing bit representation.

DESCRIPTION OF THE DRAWINGS

The present disclosure will be understood with respect to a combination of the detailed descriptions below and the accompanying drawings, in which reference numerals denote structural elements.

FIG. 4 is a flowchart of a video decoding method according to an embodiment.

FIG. 7 is a diagram for describing a bit representation method of prediction motion vectors, according to an embodiment.

BEST MODE

Figure 1:
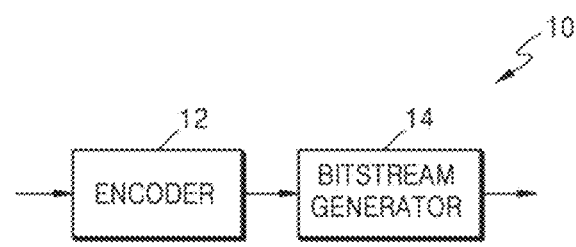
FIG. 1 is a block diagram of a video encoding apparatus according to an embodiment.

According to an aspect of an embodiment, a video decoding method performed by a video decoding apparatus, the video decoding method includes: determining prediction mode information of a current block and an index indicating a prediction candidate, from a bitstream; determining a prediction candidate list according to the prediction mode information; when the prediction mode information of the current block indicates a pre-set prediction mode, determining a motion vector indicated by the index indicating the prediction candidate from the prediction candidate list, and determining a prediction motion vector of the current block based on at least one of pieces of motion prediction information related to the motion vector; and determining a motion vector of the current block based on the prediction motion vector, wherein the pre-set prediction mode is a prediction mode different from a skip mode and a merge mode.

The prediction candidate list according to the pre-set prediction mode may include motion vectors of candidates at uniform distances from a basic motion vector.

The basic motion vector may be one of prediction motion vector candidates used in a skip mode or a merge mode of the current block.

The determining of the prediction candidate list may include determining, as a first candidate group, prediction motion vector candidates at a first pixel distance from the basic motion vector, and determining, as a second candidate group, prediction motion vector candidates at a second pixel distance from the basic motion vector.

The motion prediction information related to the motion vector may include at least one of a reference direction obtained from a neighboring block of the current block, an index of a reference picture, a value of the motion vector, and motion vector difference information, and the determining of the prediction motion vector of the current block may include determining the prediction motion vector of the current block by combining or changing the reference direction, the index of the reference picture, the value of the motion vector, and the motion vector difference information.

Indexes indicated by prediction motion vector candidates included in the prediction candidate list may include indexes indicating prediction motion vector candidates according to the skip mode or the merge mode and indexes indicating prediction motion vector candidates according to the pre-set prediction mode, wherein the indexes indicating the prediction motion vector candidates according to the pre-set prediction mode may be generated between existing indexes.

The prediction mode information of the pre-set prediction mode may be obtained between a skip flag and a merge mode flag or obtained after the skip flag and the merge mode flag.

According to an aspect of another embodiment, a video encoding method performed by a video encoding apparatus, the video encoding method includes: determining a prediction candidate list according to a pre-set prediction mode; when prediction mode information of a current block indicates the pre-set prediction mode, determining a motion vector indicated by an index from the prediction candidate list, and determining a prediction motion vector of the current block based on at least one of pieces of motion vector information related to the motion vector; determining a motion vector of the current block based on the prediction motion vector; and encoding prediction mode information indicating the pre-set prediction mode, wherein the pre-set prediction mode may be a prediction mode different from a skip mode and a merge mode.

The prediction candidate list according to the pre-set prediction mode may include, as prediction motion vector candidates, candidates at uniform distances from a basic motion vector.

The basic motion vector may be one of prediction motion vector candidates used in a skip mode or a merge mode of the current block.

The determining of the prediction candidate list may include determining, as a first candidate group, prediction motion vector candidates at a first pixel distance from the basic motion vector, and determining, as a second candidate group, prediction motion vector candidates at a second pixel distance from the basic motion vector.

Indexes indicated by prediction motion vector candidates included in the prediction candidate list may include indexes indicating prediction motion vector candidates according to the skip mode or the merge mode and indexes indicating prediction motion vector candidates according to the pre-set prediction mode, wherein the indexes indicating the prediction motion vector candidates according to the pre-set prediction mode may be generated between existing indexes.

The prediction mode information of the pre-set prediction mode may be obtained between a skip flag and a merge mode flag or obtained after the skip flag and the merge mode flag.

According to an aspect of another embodiment, a video decoding apparatus includes: a determiner configured to determine prediction mode information of a current block and an index indicating a prediction candidate, from a bitstream, and determine a prediction candidate list according to the prediction mode information; and a decoder configured to, when the prediction mode information of the current block indicates a pre-set prediction mode, determine a motion vector indicated by the index from the prediction candidate list, determine a prediction motion vector of the current block based on at least one of pieces of motion prediction information related to the motion vector, and perform motion compensation on the current block based on a motion vector of the current block obtained from the prediction motion vector, wherein the pre-set prediction mode is a prediction mode different from a skip mode and a merge mode.

According to an aspect of another embodiment, a video encoding apparatus includes: an encoder configured to determine a prediction candidate list according to pre-set prediction mode information, when prediction mode information of a current block indicates a pre-set prediction mode, determine a motion vector indicated by an index from the prediction candidate list, determine a prediction motion vector of the current block based on at least one of pieces of motion prediction information related to the motion vector, and perform motion prediction on the current block based on a motion vector of the current block obtained from the prediction motion vector;

and a bitstream generator configured to generate a bitstream including prediction mode information indicating the pre-set prediction mode, wherein the pre-set prediction mode is a prediction mode different from a skip mode and a merge mode.

MODE OF THE INVENTION

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, throughout the specification, when a part "includes" or "comprises" an element, unless there is a particular description contrary thereto, the part can further include other elements, not excluding the other elements. The term 'unit', as used herein, means a software or hardware component, such as a Field Programmable Gate Array (FPGA) or Application Specific Integrated Circuit (ASIC), which performs certain tasks. However, the term 'unit' is not limited to software or hardware. A 'unit' may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or may be further separated into additional components and "units".

While terms "first" and "second" are used to describe various components, it is obvious that the components are not limited to the terms "first" and "second". The terms "first" and "second" are used only to distinguish between each component. For example, a first component may indicate a second component or a second component may indicate a first component without conflicting with the present disclosure. The term "and/or" includes any and all combinations of one or more of the associated listed items.

The present disclosure will now be described more fully with reference to the accompanying drawings, in which embodiments of the present disclosure are shown. The present disclosure may, however, be embodied in many different forms and should not be construed as being limited to the embodiments set forth herein.

Hereinafter, a video encoding method and a video decoding method, according to embodiments, will be suggested with reference to FIGS. 1 through 7.

Also, a video encoding method and a video decoding method based on coding units of a tree structure, according to embodiments, which are applicable to the suggested video encoding method and video decoding method, will be described with reference to FIGS. 8 through 20.

Also, with reference to FIGS. 21 through 27, embodiments to which the video encoding method and the video decoding method are applicable will be described.

Hereinafter, an "image" may refer to a still image or a moving image of a video, or a video itself.

Hereinafter, a "current block" may refer to a block of an image to be encoded or decoded.

Hereinafter, a "neighboring block" refers to at least one encoded or decoded block adjacent to the current block. For example, a neighboring block may be located at the top, upper right, left, or upper left of a current block. Also, a neighboring block may be a spatially-neighboring block or a temporally-neighboring block. For example, a temporally-neighboring block may include a block of a reference picture which is adjacent to the current block. Also, a neighboring block may include a co-located block of a current block of a reference picture, or a block spatially adjacent to the co-located block.

FIG. 1 is a block diagram of a video encoding apparatus according to an embodiment.

Referring to FIG. 1, a video encoding apparatus 10 may include an encoder 12 and a bitstream generator 14. However, not all components shown in FIG. 1 are essential. The video encoding apparatus 10 may include more or less components than those shown in FIG. 1. The components will now be described.

The video encoding apparatus 10 (for example, an encoder) may search reference pictures for a prediction block most similar to a current block during inter prediction, and then transmit information about the prediction block to a video decoding apparatus 20 (for example, a decoder).

The video encoding apparatus 10 may search the reference pictures for an optimum prediction block through a motion estimation process, and generate a prediction block through a motion compensation process.

Hereinafter, "motion estimation" may denote searching reference pictures for an optimum prediction block. Also, for more precise motion estimation, the video encoding apparatus 10 may interpolate a reconstructed picture according to a type of video codec, and then perform motion estimation on the interpolated picture in sub-pixel units.

Hereinafter, "motion compensation" may denote generating a prediction block based on motion information about an optimum prediction block found during a motion estimation process. Here, the motion information may be a motion vector or a reference picture index, but is not limited thereto.

According to an embodiment, in inter prediction, the video encoding apparatus 10 transmits motion estimation result direction information, a reference index distinguishing a reference picture in a reference list, motion vector information, etc., to the video decoding apparatus 20. Here, the motion estimation result direction information may be direction information distinguishing a reference picture list 0 and a reference picture list 1. The video encoding apparatus 10 may use a prediction mode using a correlation of motion information between a neighboring block and a current block, so as to reduce an amount of motion information transferred in prediction units. The prediction mode may be a skip mode, a merge mode, an advanced motion vector prediction (AMVP) mode, but is not limited thereto, and may be another prediction mode.

The encoder 12 may form a list of candidate blocks for inducting motion information, and select a candidate block in the list. For example, the motion information may be a motion vector of a current block. In other words, the encoder 12 may determine a prediction candidate list for inducing the motion information.

In the specification, a "prediction candidate" may denote a candidate block. A "prediction candidate list" may denote a list of motion vectors of candidate blocks. The "prediction candidate list" may alternately denote a list of indexes indicating motion vectors of candidate blocks. A "basic motion vector" may denote a motion vector in which a candidate block indicates a reference block. A "prediction motion vector" may be a vector derived from the "basic motion vector", and may denote a motion vector selected to predict a motion vector of a current block from among motion vector candidates determined by using motion prediction information related to the basic motion vector.

The encoder 12 may determine a prediction candidate list according to pre-set prediction mode information. Here, a pre-set prediction mode may be a prediction mode different from a skip mode and a merge mode. The pre-set prediction mode may be a mode in which prediction motion vector candidates are generated by using not only information used during a skip mode or a merge mode but also information that may be used to encode and decode an image, and one of the prediction motion vector candidates is determined as a prediction motion vector.

For example, the encoder 12 may generate prediction motion vector candidates by using at least one of reference direction information distinguishing a reference picture list, a reference picture index, a motion vector value, and a motion vector difference, according to a pre-set prediction mode, and determine one of the prediction motion vector candidates as a prediction motion vector. This will be described later with reference to FIGS. 5A through 5D.

As another example, the encoder 12 may change at least one of reference direction information distinguishing a reference picture list, a reference picture index, a motion vector value, and a motion vector difference, according to a pre-set prediction mode, generate prediction motion vector candidates by using only changed information or by using the changed information and information before being changed, and determine one of the prediction motion vector candidates as a prediction motion vector.

According to an embodiment, a prediction candidate list according to a pre-set prediction mode may include, as prediction motion vector candidates, candidates at uniform distances from a basic motion vector. Details about determining of prediction motion vector candidates will be described later with reference to FIGS. 5A through 5D.

A prediction candidate list may include a spatial candidate or a temporal candidate. The spatial candidate may be adjacent neighboring blocks determined according to a split shape of a prediction unit based on an assumption that motions of a current block and adjacent blocks are similar. For example, a 2N×2N prediction unit may use five blocks adjacent to a current block, as spatial candidates. 2N×N, N×2N, 2N×nU, 2N×nD, nL×2N, and nR×2N prediction units may also use five blocks adjacent to a current block as spatial candidates. Also, when the determining of the spatial candidates is completed, the encoder 12 may determine a temporal candidate. Also, after the determining of the spatial or temporal candidates is completed, an additional candidate may be determined based on a combination of completed candidates.

When the prediction mode information of the current block indicates the pre-set prediction mode, the encoder 12 may determine a motion vector indicated by the prediction candidate index from the prediction candidate list. The encoder 12 may determine a prediction motion vector of the current block based on at least one of pieces of motion prediction information related to the motion vector. The encoder 12 may obtain the prediction motion vector candidates by combining the pieces of motion prediction information related to the motion vector, and determine the prediction motion vector according to a prediction block most similar to the current block from among the prediction motion vector candidates.

The motion prediction information related to the motion vector may include at least one of a reference direction obtained from neighboring blocks of a current block, an index of a reference picture, a motion vector value, and motion vector difference information, but is not limited thereto.

The encoder 12 may obtain new prediction motion vector candidates by combining or changing the reference direction, the index of the reference picture, the motion vector value, and the motion vector difference information, and determine the prediction motion vector of the current block from among the new prediction motion vector candidates.

Also, the encoder 12 may differently determine the number of prediction motion vector candidates with respect to each candidate group. The encoder 12 may determine prediction motion vector candidates at a first pixel distance from the basic motion vector as a first candidate group, prediction motion vector candidates at a second pixel distance from the basic motion vector as a second candidate group, and prediction motion vector candidates at an nth pixel distance from the basic motion vector as an nth candidate group. Here, prediction motion vector candidates at a uniform pixel distance may also include prediction motion vector candidates at a pixel distance within a pre-set error range from the uniform pixel distance. Also, the encoder 12 may form prediction motion vector candidates such that a pixel distance increases as the number of groups increases, wherein the pixel distance may increase linearly or nonlinearly.

The encoder 12 may determine a candidate index indicating a group to which a prediction motion vector belongs, from among the first candidate group and the second candidate group.

Meanwhile, indexes indicating prediction motion vector candidates included in a prediction candidate list may include indexes indicating prediction motion vector candidates according to a skip mode or a merge mode and indexes indicating prediction motion vector candidates according to a pre-set prediction mode. The indexes indicating the prediction motion vector candidates according to the pre-set prediction mode may be generated between existing indexes.

Prediction mode information of the pre-set prediction mode may be displayed by using a flag or index of an existing prediction mode. The existing prediction mode may include a skip mode, a merge mode, or an AMVP mode, but is not limited thereto. The video encoding apparatus 10 may determine a prediction motion vector by inducing a reference direction, a reference picture index, a motion vector value, etc. from a neighboring block, according to a skip mode and a merge mode. The video encoding apparatus 10 may transmit a reference direction, a reference picture index, and a difference of motion vectors to the video decoding apparatus 20 according to an AMVP mode, unlike a skip mode and a merge mode.

For example, a flag about whether to use the pre-set prediction mode may be inserted between an existing skip flag and an existing merge mode flag. When a pre-set prediction mode flag is in an on state, the video encoding apparatus 10 may not transmit syntax information related to motion prediction excluding an index of a prediction motion vector candidate, or may transmit information about a residual component. In this case, whether the information about a residual component is transmitted may be transmitted explicitly via a flag. The video encoding apparatus 10 may display the prediction mode information of the pre-set prediction mode by using the flag or index of the existing mode to reduce bit representation, thereby improving compressibility.

As another example, the flag about whether to use the pre-set prediction mode may be inserted after the merge mode flag. As described above, when the pre-set prediction mode flag is in an on state, the video encoding apparatus 10 may not transmit the syntax information related to the motion prediction excluding the index of the prediction motion vector candidate, or may transmit the information about the residual component. In this case, whether the information about the residual component is transmitted may be transmitted explicitly via a flag.

When the prediction mode information of the pre-set prediction mode is inserted into the existing index list, bit representation of the index after the prediction mode information is inserted is changed. Details thereof will be described later with reference to FIGS. 6A through 6C.

Also, the encoder 12 may determine a motion vector of the current block by using the prediction motion vector, and perform motion prediction on the current block based on the motion vector of the current block.

The bitstream generator 14 may generate a bitstream including the prediction mode information indicating the pre-set prediction mode. The video encoding apparatus 10 may generate the generated bitstream to the video decoding apparatus 20. The video encoding apparatus 10 may effectively reduce an amount of motion-related data by transmitting the prediction motion vector information selected from the prediction candidate list to the video decoding apparatus 20.

Also, the video encoding apparatus 10 may perform transformation, quantization, and entropy encoding on a residual signal that is a difference between an original block and a prediction block obtained via inter prediction.

The video encoding apparatus 10 may include a central processor (not shown) generally controlling the encoder 12 and the bitstream generator 14. The central processor may be realized as an array of a plurality of logic gates, or may be realized as a combination of a general-purpose microprocessor and a memory in which a program executable by the micro-processor is stored. Also, it would be obvious to one of ordinary skill in the art that the central processor may be realized in another form of hardware. Alternatively, the encoder 12 and the bitstream generator 14 may each be operated by a self-processor (not shown), and the video encoding apparatus 10 may be operated as the self-processors mutually operate. Alternatively, the encoder 12 and the bitstream generator 14 may be controlled according to control of an external processor (not shown) of the video encoding apparatus 10.

The video encoding apparatus 10 may include one or more memories (not shown) storing input and output data of the encoder 12 and the bitstream generator 14. The video encoding apparatus 10 may include a memory controller (not shown) controlling data input and output of the memory.

Hereinafter, various operations and applications of the video encoding apparatus 10 will be described, wherein descriptions that may be clearly understandable and expectable by one of ordinary skill in the art without specifying one of the encoder 12 and the bitstream generator 14 may be understood as general embodiments, and the scope of right of the present disclosure is not limited by a name of a specific element or a physical/logical structure. Hereinafter, operations of the video encoding apparatus 10 will be described with reference to FIG. 2.

Figure 2:
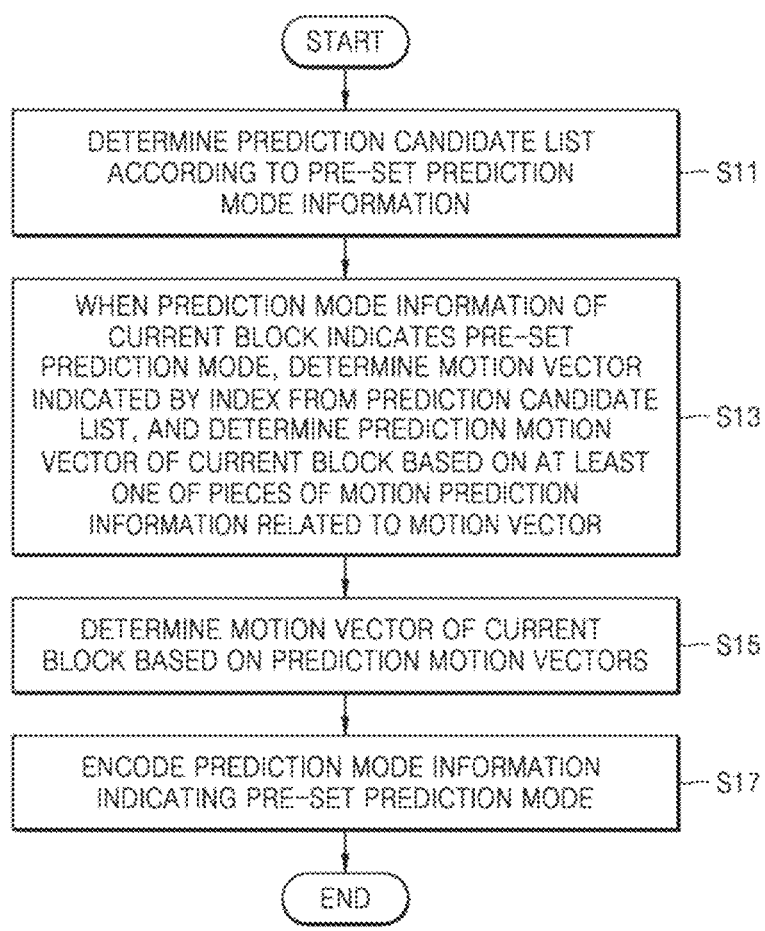
FIG. 2 is a flowchart of a video encoding method according to an embodiment.

FIG. 2 is a flowchart of a video encoding method according to an embodiment.

In operation S11 of FIG. 2, the video encoding apparatus 10 may determine a prediction candidate list according to a pre-set prediction mode. Here, the pre-set prediction mode may be a prediction mode different from a skip mode and a merge mode. The pre-set prediction mode may generate prediction motion vector candidates by using not only information used in a skip mode or a merge mode, but also information that may be used to encode and decode an image, and determine one of the prediction motion vector candidates as a prediction motion vector.

For example, the video encoding apparatus 10 may generate the prediction motion vector candidates by using at least one of a reference direction information distinguishing a reference picture list, a reference picture index, a motion vector value, and a motion vector difference, according to the pre-set prediction mode, and determine one of the prediction motion vector candidates as the prediction motion vector.

According to an embodiment, the prediction candidate list according to the pre-set prediction mode may include motion vectors of candidates at uniform distances from a basic motion vector. Also, the basic motion vector may be one of the prediction motion vector candidates used in the skip mode or the merge mode of a current block.

In operation S13, when prediction mode information of the current block indicates the pre-set prediction mode, the video encoding apparatus 10 may determine a motion vector indicated by a prediction candidate index from the prediction candidate list. The video encoding apparatus 10 may determine a prediction motion vector of the current block based on at least one of pieces of motion prediction information related to the motion vector.

The video encoding apparatus 10 may determine the prediction motion vector candidates based on at least one of the pieces of motion prediction information, and determine the prediction motion vector according to a prediction block most similar to the current block from among the determined prediction motion vector candidates.

The motion prediction information related to the motion vector may include at least one of a reference direction obtained from a neighboring block of the current block, an index of a reference picture, a value of the motion vector, and motion vector difference value, but is not limited thereto. The video encoding apparatus 10 may determine the prediction motion vector of the current block by combining or changing the reference direction, the index of the reference picture, the value of the motion vector, and the motion vector difference information.

The video encoding apparatus 10 may generate the prediction motion vector candidates by using at least one of reference direction information distinguishing a reference picture list, a reference picture index, a motion vector value, and a motion vector difference, according to the pre-set prediction mode, and determine one of the prediction motion vector candidates as the prediction motion vector.

Meanwhile, indexes indicating the prediction motion vector candidates included in the prediction candidate list may include indexes indicating prediction motion vector candidates according to the skip mode or the merge mode, and indexes indicating prediction motion vector candidates according to the pre-set prediction mode.

Here, the indexes indicating the prediction motion vector candidates according to the pre-set prediction mode may be generated between existing indexes. Also, the prediction mode information of the pre-set prediction mode may be inserted between a skip flag and a merge mode flag, or may be inserted after the skip flag or the merge mode flag.

Also, the video encoding apparatus 10 may form one candidate group by using m prediction motion vector candidates, and generate n candidate groups (here, m and n are each a positive integer). For example, the video encoding apparatus 10 may determine 4 prediction motion vector candidates at a ¼ pixel distance as a first candidate group. The video encoding apparatus 10 may determine 4 prediction motion vector candidates at a ½ pixel distance as a second candidate group.

In operation S15, the video encoding apparatus 10 may determine a motion vector of the current block based on the prediction motion vector.

In operation S17, the video encoding apparatus 10 may encode the prediction mode information indicating the pre-set prediction mode. The video encoding apparatus 10 may generate a bitstream including the prediction mode information indicating the pre-set prediction mode. The video encoding apparatus 10 may transmit the generated bitstream to the video decoding apparatus 20. Also, in order to output an encoding result of the prediction mode information, the video encoding apparatus 10 may operate in connection with an internal video encoding processor included therein or with an external video encoding processor. The internal video encoding processor of the video encoding apparatus 10 may perform basic video encoding operations as an individual processor, but alternatively, the video encoding apparatus 10, a central operating apparatus, or a graphic operating apparatus may include a video encoding processing module to perform the basic video encoding operations.

Figure 3:
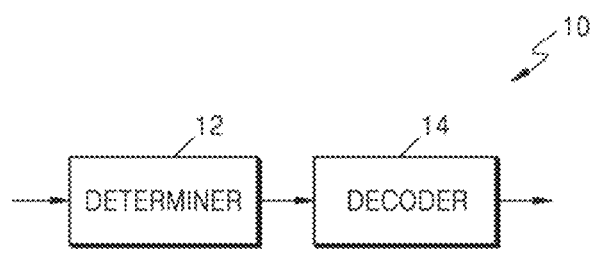
FIG. 3 is a block diagram of a video decoding apparatus according to an embodiment.

FIG. 3 is a block diagram of a video decoding apparatus according to an embodiment.

Referring to FIG. 3, the video decoding apparatus 20 may include a determiner 22 and a decoder 24. However, not all components shown in FIG. 3 are essential. The video decoding apparatus 20 may include more or less components than those shown in FIG. 3. The components will now be described.

When a prediction mode of a current block is an inter prediction mode, the video decoding apparatus 20 performs motion compensation by using reference picture information and reference block information transmitted from the video encoding apparatus 10. The video decoding apparatus 20 may generate a prediction block via motion compensation. The video decoding apparatus 20 may reconstruct an image by combining the generated prediction block and a residual signal generated via entropy encoding, inverse quantization, and inverse transformation processes.

The determiner 22 may receive a bitstream, and determine prediction mode information of the current block and an index indicating a prediction candidate, based on the received bitstream. A prediction mode may include a skip mode, a merge mode, and an AMVP mode, but is not limited thereto, and it would be obvious to one of ordinary skill in the art that the prediction mode may include another prediction mode. The skip mode and the merge mode is a mode in which a prediction motion vector is determined by indicating a reference direction, a reference picture index, a motion vector value, etc., from a neighboring block. Unlike the skip mode and the merge mode, in the AMVP mode, the reference direction, the reference picture index, and the motion vectors may be received from the video encoding apparatus 10. The prediction mode may be pre-set based on information that may be used to encode and decode an image.

The determiner 22 may form a list of candidate blocks for inducing motion information, and select a candidate block in the list. For example, the motion information may be a prediction motion vector of the current block. In other words, the determiner 22 may determine a prediction candidate list for inducing the motion information.

A "prediction candidate" may denote a candidate block. A "prediction candidate list" may denote a list of motion vectors of candidate blocks. The "prediction candidate list" may alternately denote a list of indexes indicating the motion vectors of the candidate blocks. A "basic motion vector" may denote a motion vector in which a candidate block indicates a reference block. A "prediction motion vector" is a vector derived from the "basic motion vector", and may denote a motion vector selected from among motion vector candidates determined by using motion prediction information related to the basic motion vector, so as to predict a motion vector of a current block. The determiner 22 may determine a prediction candidate list according to the prediction mode information.

When the prediction mode information of the current block indicates the pre-set prediction mode, the decoder 24 may determine a motion vector indicated by a prediction candidate index from the prediction candidate list, and determiner a prediction motion vector of the current block based on at least one of pieces of motion prediction information related to the motion vector. The decoder 24 may perform motion compensation on the current block based on a motion vector of the current block, which is obtained from the prediction motion vector. The decoder 24 may obtain information about a difference between the prediction motion vector and an original motion vector, and reconstruct the motion vector of the current block by adding the difference and the prediction motion vector. The pre-set prediction mode may be a prediction mode different from the skip mode and the merge mode. The pre-set prediction mode may be a mode in which prediction motion vector candidates are generated by using not only information that was used to in the skip mode or the merge mode but also information that may be used to encode and decode an image, and one of the prediction motion vector candidates is determined as the prediction motion vector.

For example, the decoder 24 may generate the prediction motion vector candidates by using at least one of reference direction information distinguishing a reference picture list, a reference picture index, a motion vector value, and a motion vector difference, according to the pre-set prediction mode, and determine a motion vector of a reference block from among the prediction motion vector candidates, as the prediction motion vector.

As another example, the decoder 24 may change at least one of the reference direction information distinguishing the reference picture list, the reference picture index, the motion vector value, and the motion vector difference, according to the pre-set prediction mode, generate the prediction motion vector candidates by using only the changed information or by using the changed information and information before being changed, and determine one of the prediction motion vector candidates as the prediction motion vector.

In other words, the decoder 24 may generate the prediction motion vector candidates according to the pre-set prediction mode, and determine one of the prediction motion vector candidates as the prediction motion vector.

According to an embodiment, the prediction candidate list according to the pre-set prediction mode may include, as the prediction motion vector candidates, candidates at uniform distances from an existing motion vector. Details about determining of prediction motion vector candidates will be described later with reference to FIGS. 5A through 5D. Here, a "basic motion vector" may be one of prediction motion vector candidates used in a skip mode or merge mode of a current block.

The decoder 24 may determine prediction motion vector candidates at a first pixel distance from the basic motion vector as a first candidate group, and determine prediction motion vector candidates at a second pixel distance from the basic motion vector as a second candidate group. Here, the prediction motion vector candidates at the first pixel distance may also include prediction motion vector candidates at a pixel distance within a pre-set error range with the first pixel distance.

The prediction candidate list may include a spatial candidate or a temporal candidate. The spatial candidate may be adjacent neighboring blocks determined according to a split shape of a prediction unit based on an assumption that motions of the current block and adjacent blocks are similar. For example, a 2N×2N prediction unit may use five blocks adjacent to a current block, as spatial candidates. 2N×N, N×2N, 2N×nU, 2N×nD, nL×2N, and nR×2N prediction units may also use five blocks adjacent to a current block as spatial candidates. Also, when the determining of the spatial candidates is completed, the determiner 22 may determine a temporal candidate. Also, after the determining of the spatial or temporal candidates is completed, an additional candidate may be determined based on a combination of completed candidates.

When the prediction mode information of the current block indicates the pre-set prediction mode, the decoder 24 may determine the motion vector indicated by the prediction candidate index from the prediction candidate list. The decoder 24 may determine the prediction motion vector of the current block based on at least one of the pieces of motion prediction information related to the motion vector. The decoder 24 may obtain the prediction motion vector candidates by combining the pieces of motion prediction information related to the motion vector, and determine the motion vector indicated by the prediction candidate index from the prediction motion vector candidates.

The motion prediction information related to the motion vector may include at least one of a reference direction obtained from the neighboring block of the current block, an index of a reference picture, a motion vector value, and motion vector difference information, but is not limited thereto.

The decoder 24 may obtain new prediction motion vector candidates by combining or changing the reference direction, the index of the reference picture, the value of the motion vector, and the motion vector difference information, and determine the prediction motion vector of the current block from among the new prediction motion vector candidates.

The decoder 24 may determine a candidate index indicating a group to which the prediction motion vector belongs, from among the first and second candidate groups.

Indexes indicating the prediction motion vector candidates included in the prediction candidate list may include indexes indicating the prediction motion vector candidates according to the skip mode or the merge mode, and indexes indicating prediction motion vector candidates according to the pre-set prediction mode. The indexes indicating the prediction motion vector candidates according to the pre-set prediction mode may be changed based on existing indexes. The existing indexes may be the indexes indicating the prediction motion vector candidates according to the skip mode or the merge mode. Details thereof will be described with reference to FIGS. 6A through 6C.

Also, the prediction mode information of the pre-set prediction mode may be obtained after a skip flag and a merge mode flag. Also, the prediction mode information of the pre-set prediction mode may be obtained from an AMVP mode syntax element.

The skip flag is located at a starting region of a coding unit call and displays information about whether the current block is in the skip mode. When the current block is in the skip mode, a syntax related to the motion prediction is not transmitted, except a skip index. The skip index indicates a location of a candidate selected from a list including candidates of a neighboring block. Information used as candidate information in the neighboring block includes a reference direction, a reference picture index, and a motion vector prediction value.

The merge flag is located at a starting region of a prediction unit call and displays information about whether a prediction unit block of the current block is in the merge mode. When the prediction unit block is in the merge mode, the video encoding apparatus 10 transmits a merge index and does not transmit a syntax related to a motion vector difference, a prediction direction, and a reference picture index. The merge index indicates a candidate selected from the list including the candidates of the neighboring block. Information used as candidate information in a candidate block includes a reference direction, a reference picture index, and a motion vector prediction value.

In the AMVP mode, the video encoding apparatus 10 transmits a motion vector difference (MVD) that is a difference between the motion vector and the prediction motion vector to the video decoding apparatus 20. When a mode is the AMVP mode, the video decoding apparatus 20 may also receive, together with an AMVP flag, syntaxes related to the motion vector difference, the prediction direction, and the reference picture index. The AMVP flag determines one of two candidates including the candidates of neighboring block.

The decoder 24 may decode an image by using symbols of the image parsed from a bitstream. When the video decoding apparatus 20 receives streams encoded in coding units having a tree structure, the decoder 24 may perform decoding based on the coding units having the tree structure, per largest coding unit of the stream. Details about the largest coding unit will be described with reference to FIG. 8.

The decoder 24 may obtain encoding information and encoded data by performing entropy encoding according to largest coding units. The decoder 24 may reconstruct a residual component by performing inverse quantization and inverse transformation on the encoded data obtained from the stream. Also, the decoder 24 may directly receive a bitstream of quantized transformation coefficients. Residual components of images may be reconstructed by performing inverse quantization and inverse transformation on quantized transformation coefficients.

The decoder 24 may generate a prediction block based on motion information of a prediction block most similar to the current block. Here, the motion information may include a motion vector of the prediction block and the reference picture index. The decoder 24 may reconstruct the image by combining the residual component, i.e., the difference between the prediction block and the original block, and the prediction block.

The video decoding apparatus 20 may include a central processor (not shown) generally controlling the determiner 22 and the decoder 24. The central processor may be realized as an array of a plurality of logic gates, or may be realized as a combination of a general-purpose micro-processor and a memory in which a program executable by the micro-processor is stored. Also, it would be obvious to one of ordinary skill in the art that the central processor may be realized in another form of hardware. Alternatively, the determiner 22 and the decoder 24 may each be operated by a self-processor (not shown), and the video decoding apparatus 20 may be operated as the self-processors mutually operate. Alternatively, the determiner 22 and the decoder 24 may be controlled according to control of an external processor (not shown) of the video decoding apparatus 20.

The video decoding apparatus 20 may include one or more memories (not shown) storing input and output data of the determiner 22 and the decoder 24. The video decoding apparatus 20 may include a memory controller (not shown) controlling data input and output of the memory.

Hereinafter, various operations and applications of the video decoding apparatus 20 will be described, wherein descriptions that may be clearly understandable and expectable by one of ordinary skill in the art without specifying one of the determiner 22 and the decoder 24 may be understood as general embodiments, and the scope of right of the present disclosure is not limited by a name of a specific element or a physical/logical structure. Hereinafter, operations of the video decoding apparatus 20 will be described with reference to FIG. 4.

FIG. 4 is a flowchart of a video decoding method according to an embodiment.

In operation S21 of FIG. 4, the video decoding apparatus 20 may determine prediction mode information of a current block and an index indicating a prediction candidate, from a bitstream. A prediction mode may include a skip mode, a merge mode, and an AMVP mode, but is not limited thereto.

In operation S23, the video decoding apparatus 20 may determine a prediction candidate list according to the prediction mode information.

In operation S25, when the prediction mode information of the current block indicates a pre-set prediction mode, the video decoding apparatus 20 may determine a motion vector indicated by the index from the prediction candidate list, and determine a prediction motion vector based on at least one of pieces of motion prediction information related to the motion vector.

The motion prediction information related to the motion vector may include at least one of a reference direction obtained from a neighboring block of the current block, an index of a reference picture, a value of a motion vector, and motion vector difference information, but is not limited thereto. The video decoding apparatus 20 may determine the prediction motion vector of the current block by combining or changing the reference direction, the index of the reference picture, the value of the motion vector, and the motion vector difference information.

The pre-set prediction mode may be a prediction mode different from a skip mode and a merge mode. The prediction candidate list according to the pre-set prediction mode may include, as prediction motion vector candidates, candidates at uniform distances from a basic motion vector. The basic motion vector may be one of prediction motion vector candidates used in the skip mode or the merge mode of the current block.

Meanwhile, the video decoding apparatus 20 may group prediction motion vector candidates derived from the basic motion vector based on the uniform distances. For example, the video decoding apparatus 20 may determine, as a first candidate group, prediction motion vector candidates at a first pixel distance from the basic motion vector, and determine, as a second candidate group, prediction motion vector candidates at a second pixel distance from the basic motion vector.

The video decoding apparatus 20 may determine a group to which the prediction motion vector belongs from among the first and second candidate groups, as a candidate index obtained from the bitstream.

In operation S27, the video decoding apparatus 20 may determine a motion vector of the current block based on the prediction motion vector. The video decoding apparatus 20 may perform motion compensation on the current block based on the motion vector of the current block.

The video decoding apparatus 20 may reconstruct the motion vector of the current block by extracting information about a difference between the prediction motion vector and the original motion vector and then adding the difference and the prediction motion vector.

In order to reconstruct a video via video decoding, the video decoding apparatus 20 may perform video decoding operation by operating in connection with an internal video decoding processor included therein or with an external video decoding processor. The internal video decoding processor of the video decoding apparatus 20 may perform basic video decoding operations as an individual processor, but alternatively, the video decoding apparatus 20, a central operating apparatus, or a graphic operating apparatus may include a video decoding processing module to perform the basic video decoding operations.

FIGS. 5A through 5D are diagrams for describing processes of determining prediction motion vector candidates, according to an embodiment.

According to an embodiment, when a prediction mode of a current block is a pre-set prediction mode different from a skip mode, a merge mode, and an AMVP mode, the video decoding apparatus 20 may determine prediction motion vector candidates by using a basic motion vector. Here, the basic motion vector may be one of the prediction motion vector candidates used in the skip mode or the merge mode of the current block. The basic motion vector may be one of vector candidates used in a predetermined prediction mode aside from the skip mode or the merge mode.

Also, the basic motion vector may be determined from a motion vector of a coded block of a picture that is currently encoded, or from a motion vector of a coded block of a picture that may be temporally referred to by a current picture. For example, the basic motion vector may be one of the prediction motion vector candidates used in the skip mode or the merge mode of the current block.

Also, the basic motion vector may be determined through operations between basic motion vectors.

Also, when a prediction candidate includes motion vector information in a first prediction mode, the video decoding apparatus 20 may determine the motion vector information as the basic motion vector.

Referring to FIGS. 5A through 5D, the video decoding apparatus 20 may determine motion vectors having a spiral distribution while forming the prediction motion vector candidates. A shape of the spiral distribution may be similar to a polygon, such as a rhombus or a rectangle, or similar to a circle.

The video decoding apparatus 20 may determine candidates at uniform distances from the basic motion vector as prediction motion vector candidates. The video decoding apparatus 20 may determine prediction motion vector candidates at a first pixel distance from the basic motion vector as a first candidate group, prediction motion vector candidates at a second pixel distance as a second candidate group, and prediction motion vector candidates at an nth pixel distance as an nth candidate group. Here, the video decoding apparatus 20 may determine prediction motion vector candidates closest to the basic motion vector as the first candidate group and prediction motion vector candidates second closest to the basic motion vector as the second candidate group, wherein a candidate group number sequentially increases as a pixel distance increases.

When a ¼ pixel unit is 1, a pixel distance interval may be determined to be a log scale interval or a nonlinear interval as the candidate group number increases. Alternatively, an interval of the pixel distance may be determined by a user.

The number of prediction motion vector candidates in each candidate group may be between 1 to M.

Figure 5A:
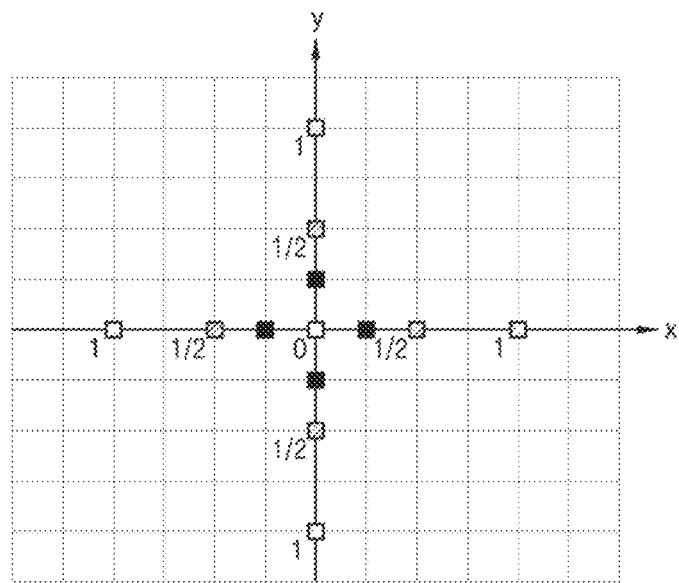
FIGS. 5A through 5D are diagrams for describing processes of determining prediction motion vector candidates, according to an embodiment.
Figure 5B:
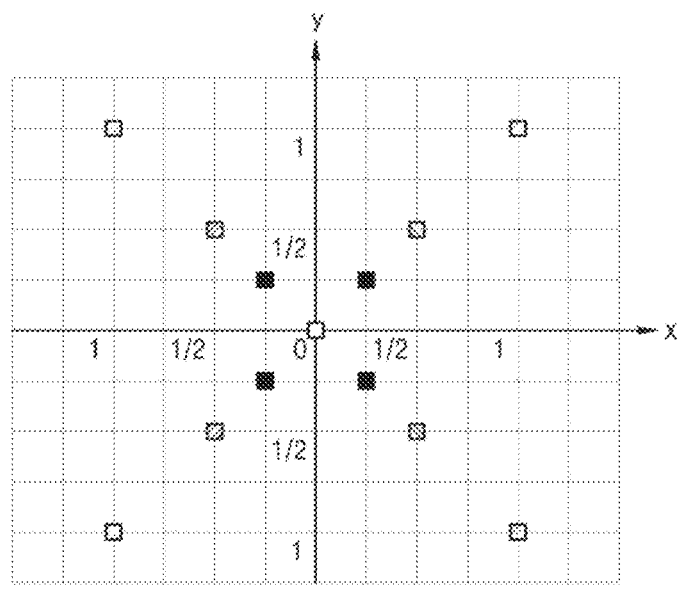

In FIGS. 5A and 5B, the number of prediction motion vector candidates in each candidate group is 4 (M=4). Here, the number of candidate groups may be 3, but is not limited thereto.

Referring to FIG. 5A, the video decoding apparatus 20 may determine the prediction motion vector candidates having a distribution of a rhombus shape based on the basic motion vector. Each interval between pixels is a ¼ pixel distance, but for convenience, component values of vector candidates are scaled 4 times.

The video decoding apparatus 20 may determine prediction motion vector candidates (base_x+1, base_y) 502, (base_x-1, base_y) 503, (base_x, base_y+1) 504, and (base_x, base_y-1) 505 at a ¼ pixel distance from a basic motion vector (base_x, base_y) 501 as a first candidate group.

The video decoding apparatus 20 may determine prediction motion vector candidates (base_x+2, base_y) 506, (base_x-2, base_y) 507, (base_x, base_y+2) 508, and (base_x, base_y-2) 509 at a ½ pixel distance from the basic motion vector (base_x, base_y) 501 as a second candidate group.

The video decoding apparatus 20 may determine prediction motion vector candidates (base_x+4, base_y) 510, (base_x-4, base_y) 511, (base_x, base_y+4) 512, and (base_x, base_y-4) 513 at 1 pixel distance from the basic motion vector (base_x, base_y) 501 as a third candidate group.

Referring to FIG. 5B, the video decoding apparatus 20 may determine prediction motion vector candidates having a distribution of a rectangular shape based on a basic motion vector. Each interval between pixels is a ¼ pixel distance, but for convenience, component values of vector candidates are scaled 4 times.

Similarly, the video decoding apparatus 20 may determine prediction motion vector candidates (base_x+1, base_y+1) 521, (base_x+1, base_y-1) 522, (base_x-1, base_y+1) 523, and (base_x-1, base_y-1) 524 at about ¼ pixel distance from a basic motion vector (base_x, base_y) 501 as a first candidate group.

The video decoding apparatus 20 may determine prediction motion vector candidates (base_x+2, base_y+2) 525, (base_x+2, base_y-2) 526, (base_x-2, base_y+2) 527, and (base_x-2, base_y-2) 528 at about ½ pixel distance from the basic motion vector (base_x, base_y) 501 as a second candidate group.

The video decoding apparatus 20 may determine prediction motion vector candidates (basc_x+4, base_y+4) 529, (base_x+4, base_y-4) 530, (base_x-4, base_y+4) 531, and (base_x-4, base_y-4) 532 at about 1 pixel distance from the basic motion vector (base_x, base_y) 501 as a third candidate group.

Figure 5C:
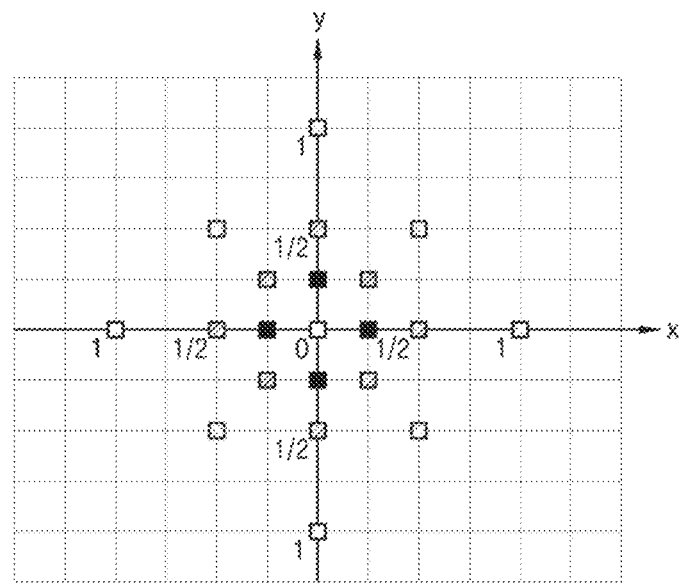

Referring to FIG. 5C, the video decoding apparatus 20 may determine different numbers of prediction motion vector candidates as groups. Each interval between pixels is a ¼ pixel distance, but for convenience, component values of vector candidates are scaled 4 times.

For example, the video decoding apparatus 20 may determine 8 prediction motion vector candidates (base_x+1, base_y) 502, (base_x-1, base_y) 503, (base_x, base_y+1) 504, (base_x, base_y-1) 505, (base_x+1, base_y+1) 521, (base_x+1, base_y-1) 522, (base_x-1, base_y+1) 523, and (base_x-1, base_y-1) 524 at about ¼ pixel distance from a basic motion vector as a first candidate group.

Also, the video decoding apparatus 20 may determine 8 prediction motion vector candidates (base_x+2, base_y) 506, (base_x-2, base_y) 507, (base_x, base_y+2) 508, (base_x, base_y-2) 509, (base_x+2, base_y+2) 525, (base_x+2, base_y-2) 526, (base_x-2, basc_y+2) 527, and (base_x-2, base_y-2) 528 at about ½ pixel distance from the basic motion vector as a second candidate group.

The video decoding apparatus 20 may determine 4 prediction motion vector candidates (base_x+4, base_y) 510, (base_x-4, base_y) 511, (base_x, base_y+4) 512, and (base_x, base_y-4) 513 at about 1 pixel distance from the basic motion vector as a third candidate group.

Figure 5D:
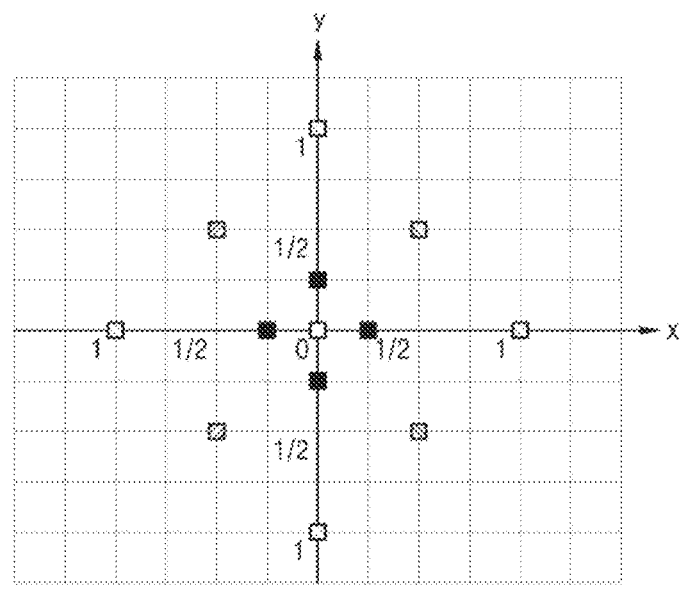

Referring to FIG. 5D, the video decoding apparatus 20 may determine prediction motion vector candidates according to candidate groups, and variously determine a distribution shape of each candidate group. For example, the video decoding apparatus 20 may determine prediction motion vector candidates 502, 503, 504, and 505 having a distribution of a rhombus shape based on a basic motion vector 501 as a first candidate group. Also, the video decoding apparatus 20 may determine prediction motion vector candidates 525, 526, 527, and 528 having a distribution of a rectangular shape based on the basic motion vector 501 as a second candidate group. Also, the video decoding apparatus 20 may determine prediction motion vector candidates 510, 511, 512, and 513 having a distribution of a rhombus shape based on the basic motion vector 501 as a third candidate group. As shown in FIG. 5D, a distribution of prediction motion vector candidates of each candidate group may be determined to various distribution shapes in addition to those shown in FIG. 5D.

The basic decoding apparatus 20 may determine one or more basic motion vectors. When there are two basic motion vectors, prediction motion vector candidates may be generated by using each of the basic motion vectors.

The video decoding apparatus 20 may perform bidirectional motion prediction. When bidirectional prediction is performed on a basic motion vector by using reference pictures in List 0 and List 1, motion vectors of each reference direction may be changed to a size of an opposite sign.

For example, when a POC of a picture currently decoded exists between two prediction reference picture POCs (a POC of a reference picture in List 0<a POC of a currently decoded picture<a POC of a reference picture in List 1), and a prediction motion vector candidate indicating the reference picture in List 0 from the basic motion vector in the currently decoded picture is determined to be (x+1, y), the video decoding apparatus 20 may determine a prediction motion vector candidate indicating the reference picture in List 1 from the basic motion vector to be (x−1, y). Here, a List 0 motion vector and a List 1 motion vector may be a vector in which an x or y component value of the basic motion vector is moved by a changed amount of an opposite sign. For example, the L0 motion vector may be determined to be (x+1) and the L0 motion vector may be determined to be (x−1, y) as an x component is changed by +1and −1 from the basic motion vector (x,y).

When the POC of the picture currently decoded does not exist between the POCs of the reference picture in List 0 and the reference picture of List 1, the prediction motion vector candidates indicating the reference pictures in List 0 and List 1 may be changed to a size of same or different signs.

Figures 6A, 6B, 6C:
FIGS. 6A through 6C are diagrams for describing a bit representation method, when pre-set prediction mode information is inserted into an existing predictor candidate list, according to an embodiment.

FIGS. 6A through 6C are diagrams for describing a bit representation method, when pre-set prediction mode information is inserted into an existing predictor candidate list, according to an embodiment. In other words, FIGS. 6A through 6C are diagrams for describing an example of displaying usage of a pre-set prediction mode by using one of 5 indexes in a skip mode or a merge mode.

When the skip mode or the merge mode uses 5 candidates and 1 index is additionally used to display the pre-set prediction mode, the skip mode or the merge mode may use total 6 candidates. When index information promised via use of the pre-set prediction mode is obtained while parsing an index of the skip mode or the merge mode, the video decoding apparatus 20 may determine that the pre-set prediction mode is used and additionally parse indexes of prediction motion vector candidates. In this case, which index of the skip mode or the merge mode notifies the use of the pre-set prediction mode according to sequences, pictures, and slices may be interpreted by using information parsed in an upper level. An example of the upper level includes header information. The video encoding apparatus 10 may determine which index of the skip mode or the merge mode may be displayed as usage information of the pre-set prediction mode, according to sequences, pictures, and slices.

According to an embodiment, the video encoding apparatus 10 may adaptively determine an order in sequence, picture, or slice units by statistically accumulating hit ratio information between an index indicating use of the pre-set prediction mode and indexes of existing candidates of the skip mode or the merge mode. The index indicating use of the pre-set prediction mode may be explicitly signaled to a following picture or slice header. Accordingly, the video decoding apparatus 20 may analyze which index indicates use of the pre-set prediction mode by using information obtained from the picture or slice header.

FIG. 6A shows an indexing method of 5 prediction motion vector candidates of a skip mode or a merge mode in a truncated unary method.

FIG. 6B is a diagram for describing a location of an existing index list, into which prediction mode information of a pre-set prediction mode is insertable. The existing index list may be a list before the prediction mode information of the prediction mode is inserted into an index list. For example, the existing index list may be an index list indicating a candidate of a skip mode or a merge mode. The prediction mode information of the pre-set prediction mode may be inserted into the index list in a form of one candidate. As shown in FIG. 6B, there are 6 locations 601 through 606 of the existing index list, into which the prediction mode information of the pre-set prediction mode is insertable.

FIG. 6C is a diagram for describing a change of a representation bit when prediction mode information of a pre-set prediction mode is inserted into IDX3 of an existing index list. As shown in FIG. 6C, when the prediction mode information of the pre-set prediction mode is inserted after IDX2, an index 610 of the prediction mode information may be represented as 1110 according to a truncated unary method, and IDX3 and IDX4 may be represented in a bit increased by 1 bit each.

FIG. 7 is a diagram for describing a bit representation method of prediction motion vectors, according to an embodiment.

The video encoding apparatus 10 may not signal absolute locations of prediction motion vector candidates, but may index and transmit prediction motion vector candidates generated according to a certain standard. For example, signaling of absolute locations of prediction motion vector candidates may denote transmitting of a difference between a basic motion vector and a prediction motion vector candidate, and a certain standard may be selecting of a prediction motion vector candidate in a spiral distribution. As shown in FIG. 7, a bit may represent which prediction motion vector candidate has been used.

Referring to FIG. 7, NIDX indicates information about which basic motion vector has been used. For example, information of a first basic motion vector may be assigned to IDX0, and information of a second basic motion vector may be assigned to IDX1. NIDX to which information of each basic motion vector is assigned may be determined according to a frequency of being selected as a basic motion vector related to a prediction motion vector. Index information of each basic motion vector may be represented in a bit 701 of FIG. 7.

Also, prediction motion vector candidates derived from the same basic motion vector may be grouped to a candidate group according to a certain standard. Here, the certain standard may be a standard of determining candidates at same pixel distances from the basic motion vector as prediction motion vector candidates. Index information about each group may be represented in a bit 702 of FIG. 7.

When an index of a pre-set prediction mode is defined as IDX3, prediction motion vector candidates derived from a basic motion vector in IDX3 may be represented in NIDX. Also, each NIDX may include prediction motion vector candidates based on the basic motion vector according to groups. Representation of NIDX may use a fixed length coding (FLC) method or a truncated unary method.

FIG. 7 illustrates an example of a truncated unary method. Information of NIDX is expressed by using the truncated unary method, and may indicate a group to which a prediction motion vector is included. Representation of each candidate group with respect to a basic motion vector may also use an FLC method or a truncated unary method.

When each candidate group of prediction motion vectors are expressed via truncated unary, the each candidate group may be adaptively expressed in another bit representation in picture of slice units. For example, when a candidate in a third candidate group is mostly selected as a prediction motion vector based on a result of obtaining accumulated group hit ratio by the video encoding apparatus 10, such information may be signaled to a next picture or slice header such that the third candidate group is represented in a shortest bit representation "0".

In this case, a method of signaling to a next picture or slice header may be replaced by a method of transmitting an index of a candidate group that is mostly selected. For example, let's assume that an order of groups mostly selected is as follows.

Third Candidate Group>Second Candidate Group>Fourth Candidate Group>First Candidate Group>Fifth Candidate Group>$0^{th}$ Candidate Group>Sixth Candidate Group>Seventh Candidate Group For example, in order to transmit upper 3 pieces of information, representation information of total 9 bits is required in picture or slice units, i.e., 3 pieces by 3 bits (total 8 candidates). When upper three pieces of candidate group information expected to have high frequencies are transmitted, "011", i.e., representation bits of the third candidate group, "010", i.e., representation bits of the second candidate group, and "100", i.e., representation bits of the fourth candidate group, are each signaled.

Meanwhile, a bit representation is required to signal candidate group information and to indicate one of four candidates in a candidate group. Referring to a reference numeral 703 of FIG. 7, candidates existing in a four azimuth may be divided into two or more groups to apply a CABAC context model. The context model may be applied to a flag obtained by dividing horizontal component candidates and vertical component candidates into 2 of 2 groups. Referring to a reference numeral 704 of FIG. 7, the contact model may also be applied to a flag for determining which one of two candidates is to be used after flag parsing.

In the video encoding apparatus 10 according to an embodiment and the video decoding apparatus 20 according to an embodiment, blocks obtained by splitting video data may be split into largest coding units, and decoded based on coding units having a tree structure, according to the largest coding units.

Hereinafter, with reference to FIGS. 8 through 20, a video encoding method, a video encoding apparatus, a video decoding method, and a video decoding apparatus based on coding units having a tree structure and transformation units, according to various embodiments, will be described.

Figure 8:
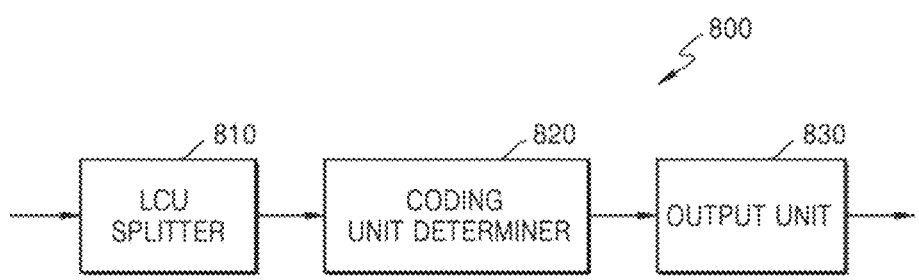
FIG. 8 is a block diagram of a video encoding apparatus based on coding units according to a tree structure, according to an embodiment.

FIG. 8 is a block diagram of the video encoding apparatus based on coding units according to a tree structure 800, according to an embodiment of the present disclosure.

The video encoding apparatus involving video prediction based on coding units according to a tree structure 800 according to an embodiment includes a coding unit determiner 820 and an output unit 830 Hereinafter, for convenience of description, the video encoding apparatus involving video prediction based on coding units according to a tree structure 800 will be abbreviated to the 'video encoding apparatus 800'.

The coding unit determiner 820 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. That is, the coding unit determiner 820 determines a final depth by encoding the image data in the deeper coding units according to depths, according to the largest coding unit of the current picture, and selecting a depth having the minimum encoding error. The determined final depth and the image data according to each largest coding unit are output to the output unit 830.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to an embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the minimum coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition mode may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, and partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 800 according to an embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 820 not only determines a depth having a least encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs, in bitstreams, the image data of the largest coding unit, which is encoded based on the at least one depth determined by the coding unit determiner 820, and information according to depths.

The encoded image data may correspond to a result obtained by encoding residual data of an image.

The split information according to depths may include depth information, partition mode information of the prediction unit, prediction mode information, and the split information of the transformation unit.

Final depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 830 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information, prediction information, and slice type information that are related to prediction.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 800 according to an embodiment, image compression efficiency may be increased since a coding unit is adjusted while considering characteristics of an image while increasing a maximum size of a coding unit while considering a size of the image.

Figure 9:
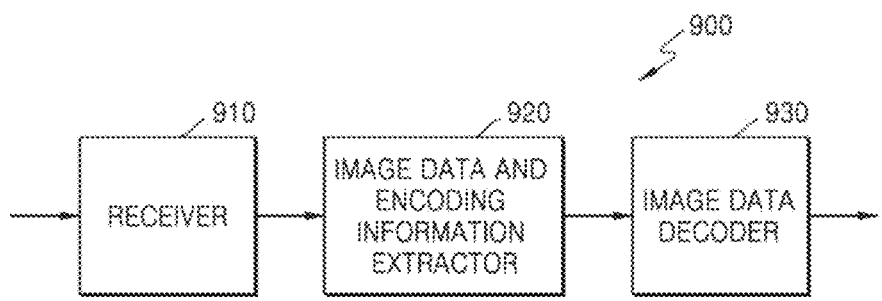
FIG. 9 is a block diagram of a video decoding apparatus based on coding units according to a tree structure, according to an embodiment.

FIG. 9 is a block diagram of the video decoding apparatus based on coding units according to a tree structure 900, according to various embodiments.

The video decoding apparatus involving video prediction based on coding units of the tree structure 200 according to the embodiment includes a receiver 910, an image data and encoding information extractor 920, and an image data decoder 930. Hereinafter, for convenience of description, the video decoding apparatus involving video prediction based on coding units of the tree structure 900 according to the embodiment is referred to as the 'video decoding apparatus 900'.

Definitions of various terms, such as a coding unit, a depth, a prediction unit, a transformation unit, and various types of split information for decoding operations of the video decoding apparatus 900 according to the embodiment are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information about the coding units having a tree structure according to each largest coding unit, from the parsed bitstream. The extracted final depth and the extracted split information are output to the image data decoder 930. That is, the image data in a bitstream is split into the largest coding unit so that the image data decoder 930 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 920 are a depth and split information determined to generate a minimum encoding error when an encoder, such as the video encoding apparatus 800, repeatedly performs encoding for each deeper coding unit according to depths according to each largest coding unit. Accordingly, the video decoding apparatus 900 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 920 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 930 reconstructs the current picture by decoding the image data in each largest coding unit based on the depth and the split information according to each of the largest coding units. That is, the image data decoder 930 may decode the encoded image data based on the read information about the partition mode, the prediction mode, and the transformation unit for each coding unit from among the coding units having the tree structure included in each largest coding unit. A decoding process may include a prediction process including intra prediction and motion compensation, and an inverse transformation process.

The image data decoder 930 may perform intra prediction or motion compensation according to a partition and a prediction mode of each coding unit, based on the information about the partition type and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each largest coding unit. Due to the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

Thus, the video decoding apparatus 900 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
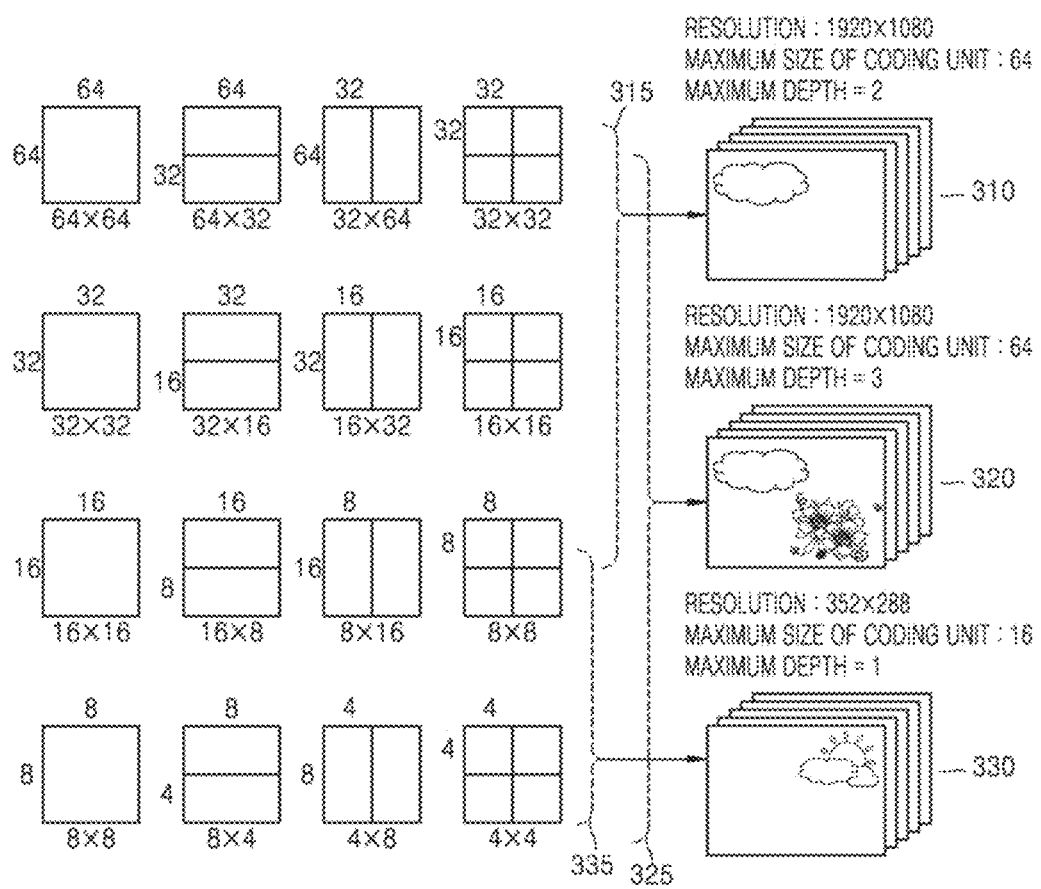
FIG. 10 illustrates a concept of coding units, according to an embodiment.

FIG. 10 is a diagram for describing a concept of coding units according to various embodiments.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
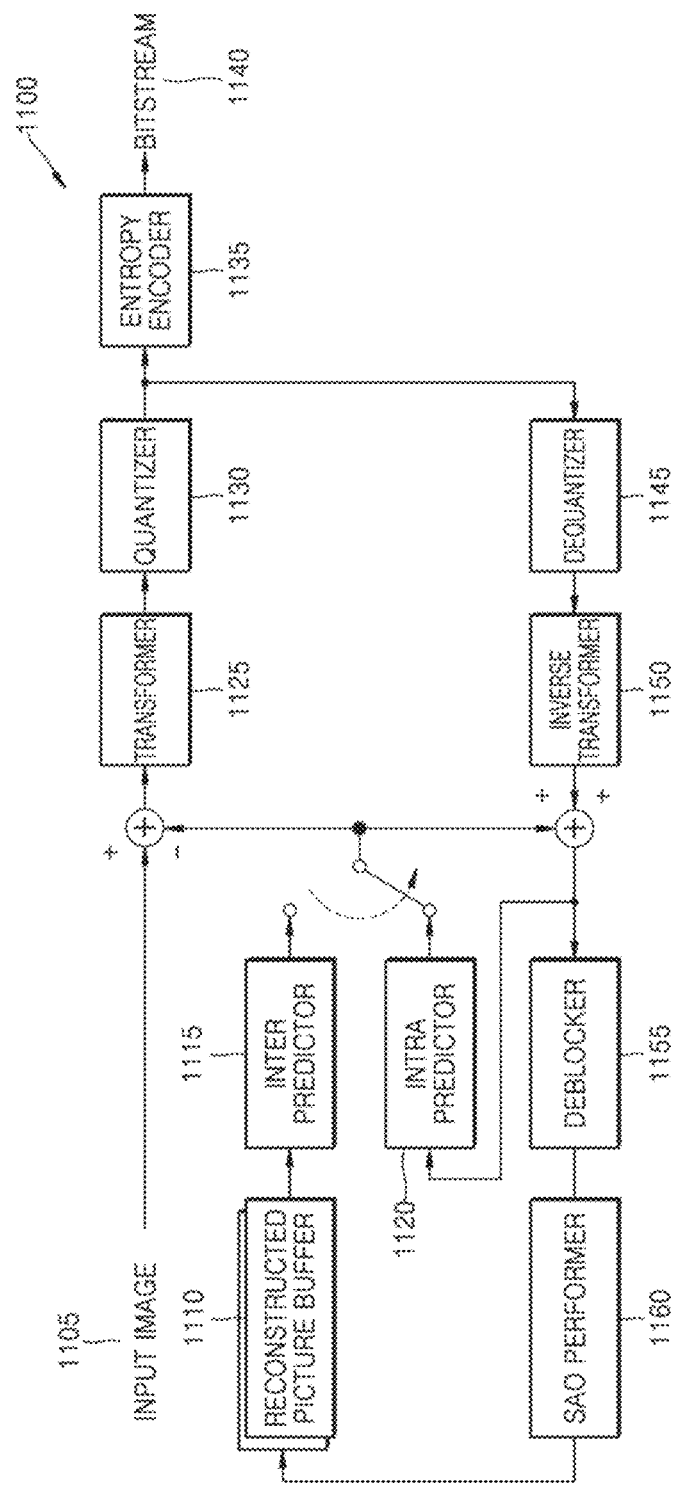
FIG. 11 is a block diagram of a video encoder based on coding units, according to an embodiment.

FIG. 11 is a block diagram of a video encoder 1100 based on coding units, according to various embodiments.

The video encoder 1100 according to an embodiment performs operations of the coding unit determiner 820 of the video encoding apparatus 800 so as to encode image data. That is, an intra predictor 1120 performs intra prediction on coding units in an intra mode according to prediction units, from among a current image 1105, and an inter predictor 1115 performs inter prediction on coding units in an inter mode by using the current image 1105 and a reference image obtained from a reconstructed picture buffer 1110 according to prediction units. The current image 1105 may be split into largest coding units and then the largest coding units may be sequentially encoded. In this regard, the largest coding units that are to be split into coding units having a tree structure may be encoded.

Residue data is generated by removing prediction data regarding coding units of each mode that is output from the intra predictor 1120 or the inter predictor 1115 from data regarding encoded coding units of the current image 1105, and the residue data is output as a quantized transformation coefficient according to transformation units via a transformer 1125 and a quantizer 1130. The quantized transformation coefficient is reconstructed as the residue data in a spatial domain via an inverse-quantizer 1145 and an inverse-transformer 1150. The reconstructed residue data in the spatial domain is added to prediction data for coding units of each mode that is output from the intra predictor 1120 or the inter predictor 1115 and thus is reconstructed as data in a spatial domain for coding units of the current image 1105. The reconstructed data in the spatial domain is generated as reconstructed images via a de-blocker 1155 and an SAO performer 1160. The reconstructed images are stored in the reconstructed picture buffer 1110. The reconstructed images stored in the reconstructed picture buffer 1110 may be used as reference images for inter prediction of another image. The transformation coefficient quantized by the transformer 1125 and the quantizer 1130 may be output as a bitstream 1140 via an entropy encoder 1135.

In order for the image encoder 1100 to be applied in the video encoding apparatus 800, all elements of the image encoder 1100, i.e., the inter predictor 1115, the intra predictor 1120, the transformer 1125, the quantizer 1130, the entropy encoder 1135, the inverse-quantizer 1145, the inverse-transformer 1150, the de-blocker 1155, and the SAO performer 1160, perform operations based on each coding unit among coding units having a tree structure according to each largest coding unit.

In particular, the intra predictor 1120 and the inter predictor 1115 may determine a partition mode and a prediction mode of each coding unit from among the coding units having a tree structure by taking into account a maximum size and a maximum depth of a current largest coding unit, and the transformer 1125 may determine whether to split a transformation unit having a quadtree structure in each coding unit from among the coding units having a tree structure.

Figure 12:
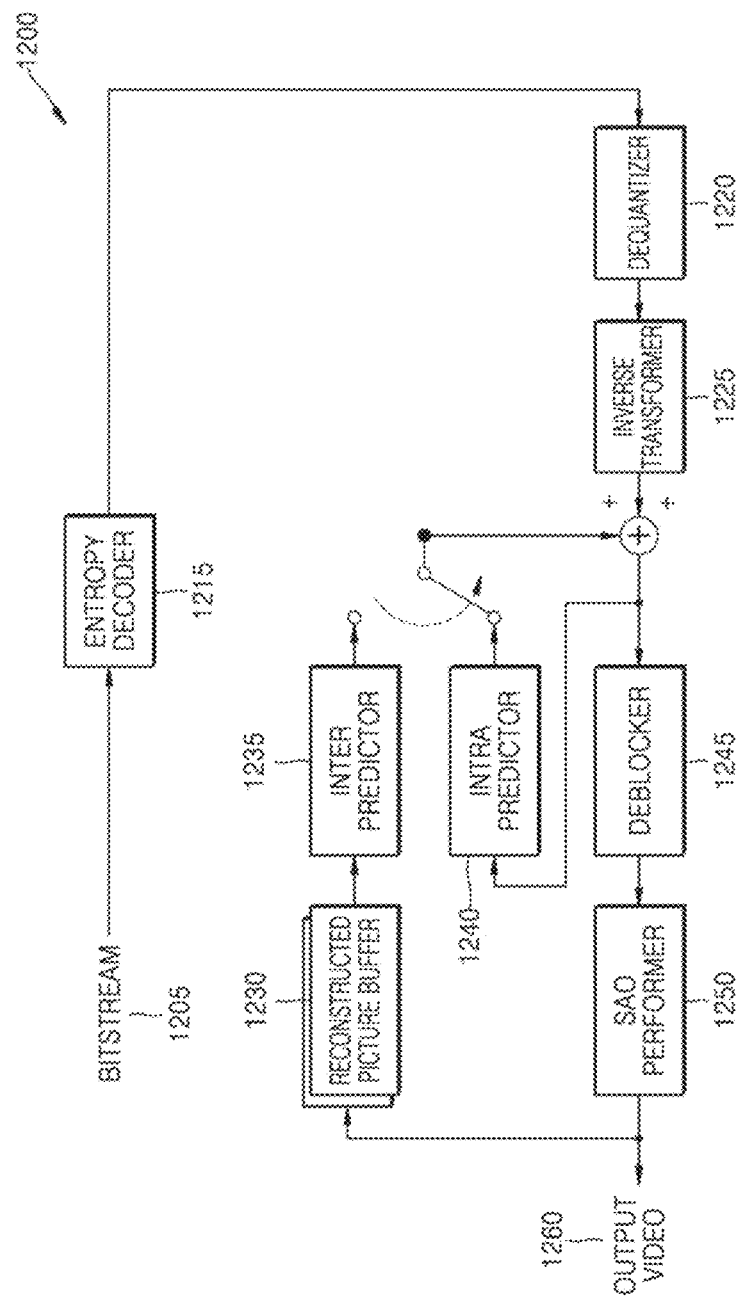
FIG. 12 is a block diagram of a video decoder based on coding units, according to an embodiment.

FIG. 12 is a block diagram of a video decoder 1200 based on coding units, according to various embodiments.

An entropy decoder 1215 parses decoding-target encoded image data and encoding information required for decoding from a bitstream 1205. The encoded image data is a quantized transformation coefficient, and an inverse-quantizer 1220 and an inverse-transformer 1225 reconstructs residue data from the quantized transformation coefficient.

An intra predictor 1240 performs intra prediction on coding units in an intra mode according to each prediction unit. An inter predictor 1235 performs inter prediction on coding units in an inter mode from among a current image for each prediction unit by using a reference image obtained from a reconstructed picture buffer 1230.

Prediction data and residue data regarding coding units of each mode which passed through the intra predictor 1240 or the inter predictor 1235 are summed, and thus data in a spatial domain regarding coding units of the current image 1105 may be reconstructed, and the reconstructed data in the spatial domain may be output as a reconstructed image 1260 via a de-blocker 1245 and an SAO performer 1250. Reconstructed images stored in the reconstructed picture buffer 1230 may be output as reference images.

In order to decode the image data in a picture decoder 930 of the video decoding apparatus 900, operations after the entropy decoder 1215 of the image decoder 1200 according to an embodiment may be performed.

In order for the image decoder 1200 to be applied in the video decoding apparatus 900 according to an embodiment, all elements of the image decoder 1200, i.e., the entropy decoder 1215, the inverse-quantizer 1220, the inverse-transformer 1225, the inter predictor 1240, the inter predictor 1235, the de-blocker 1245, and the SAO performer 1250 may perform operations based on coding units having a tree structure for each largest coding unit.

In particular, the intra predictor 1240 and the inter predictor 1235 may determine a partition mode and a prediction mode for each of the coding units having a tree structure, and the inverse-transformer 1225 may determine whether to split a transformation unit according to a quad tree structure for each of the coding units.

Figure 13:
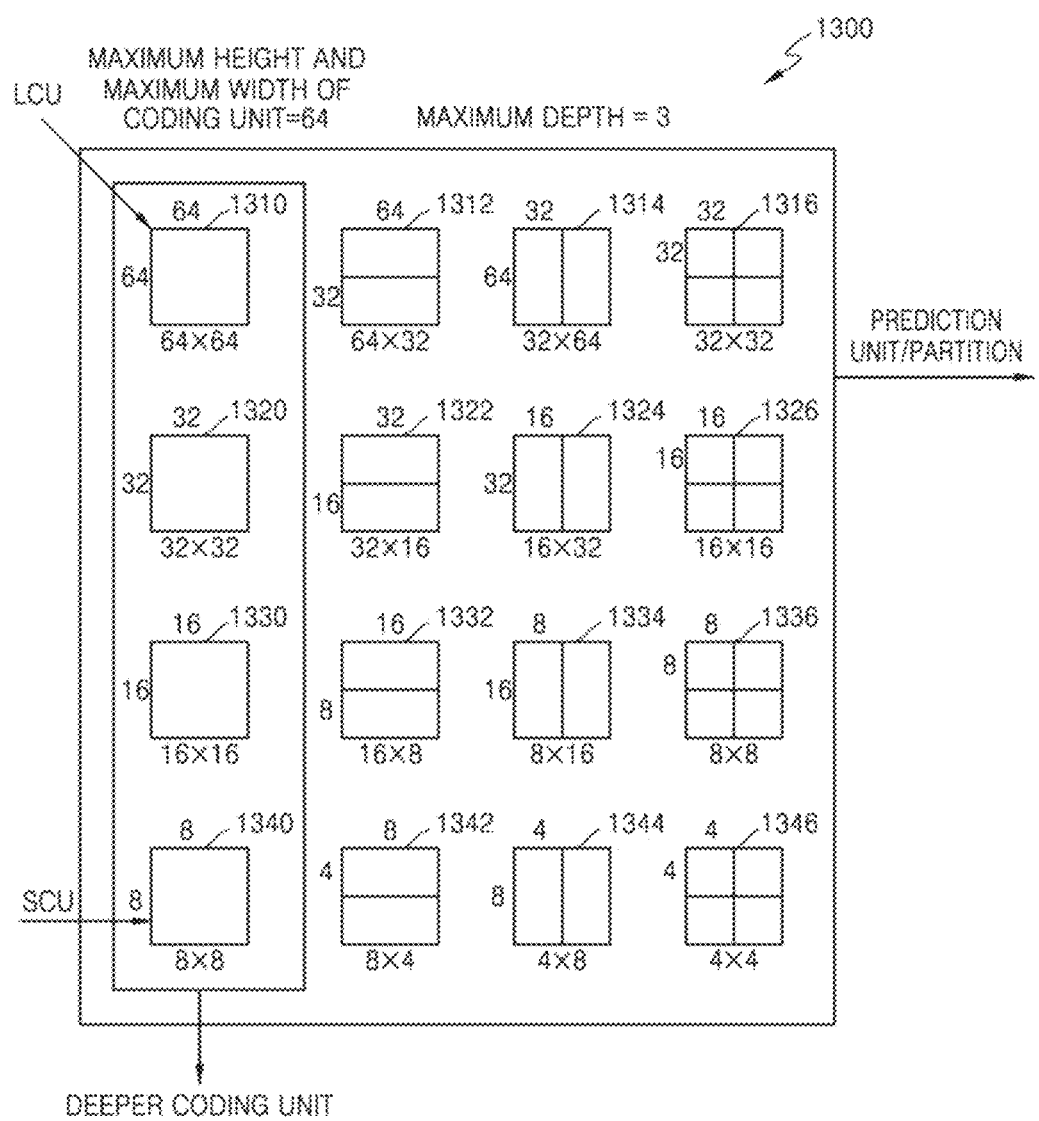
FIG. 13 is a diagram illustrating coding units and partitions, according to an embodiment.

FIG. 13 is a diagram illustrating coding units according to depths and partitions, according to various embodiments.

The video encoding apparatus 800 and the video decoding apparatus 900 use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth indicates a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3 are present. The coding unit 1340 having the size of 8×8 and the depth of 3 is a smallest coding unit.

The prediction unit and the partitions of a coding unit are arranged along the horizontal axis according to each depth. That is, if the coding unit 1310 having a size of 64×64 and a depth of 0 is a prediction unit, the prediction unit may be split into partitions include in the coding unit 1310 having the size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition 1330 having a size of 16×16 included in the coding unit 1330, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition 1340 having a size of 8×8 included in the coding unit 1340, partitions 1342 having a size of 8×4, partitions 1344 having a size of 4×8, and partitions 1346 having a size of 4×4.

In order to determine a depth of the largest coding unit 1310, the coding unit determiner 820 of the video encoding apparatus 800 has to perform encoding on coding units respectively corresponding to depths included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1300. Alternatively, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

Figure 14:
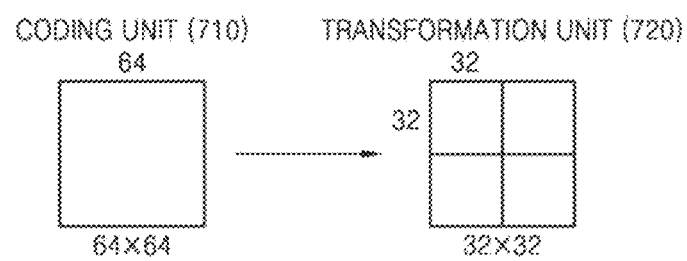
FIG. 14 is a diagram for describing a relationship between a coding unit and transformation units, according to an embodiment.

FIG. 14 is a diagram for describing a relationship between a coding unit and transformation units, according to various embodiments.

The video encoding apparatus 800 or the video decoding apparatus 900 encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 800 or the video decoding apparatus 900, when a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
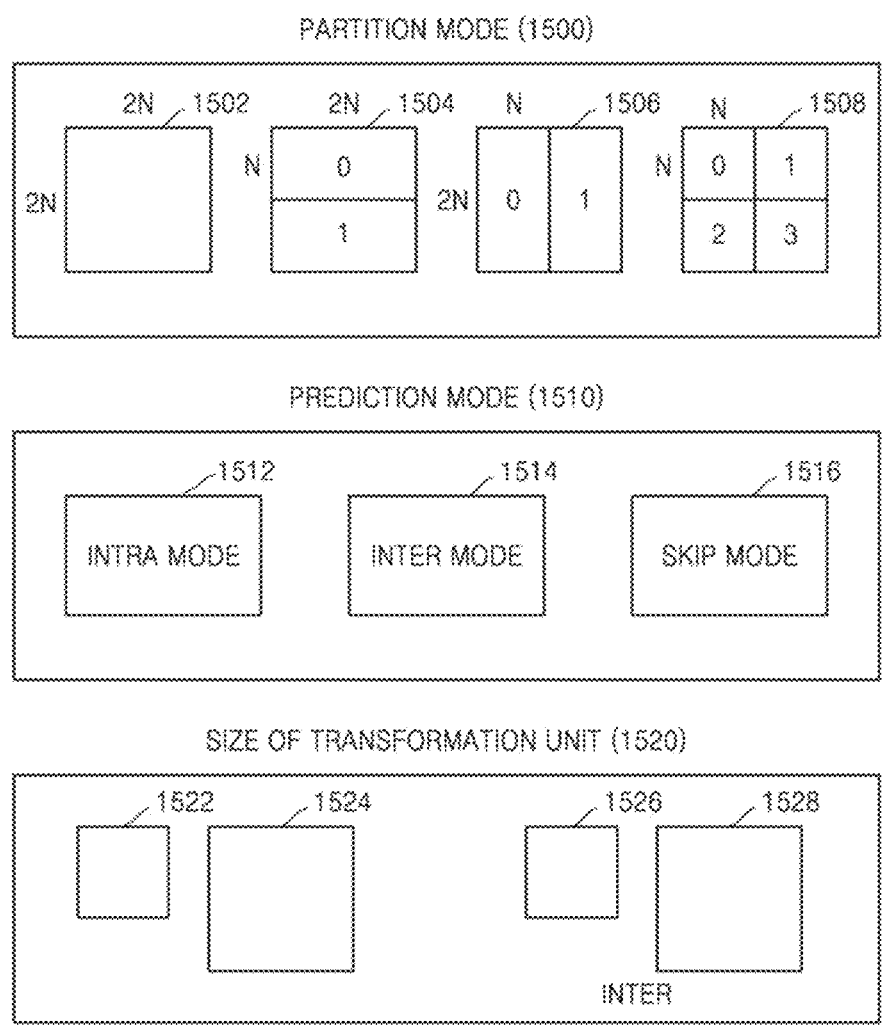
FIG. 15 illustrates a plurality of pieces of encoding information, according to an embodiment.

FIG. 15 illustrates a plurality of pieces of encoding information according to various embodiments.

The output unit 830 of the video encoding apparatus 800 may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the partition mode information 1500 about a current coding unit is set to indicate one of the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 920 of the video decoding apparatus 900 according to an embodiment may extract and use the partition mode information 1500, the prediction mode information 1510, and the transformation unit size information 1520 for decoding, according to each deeper coding unit.

Figure 16:
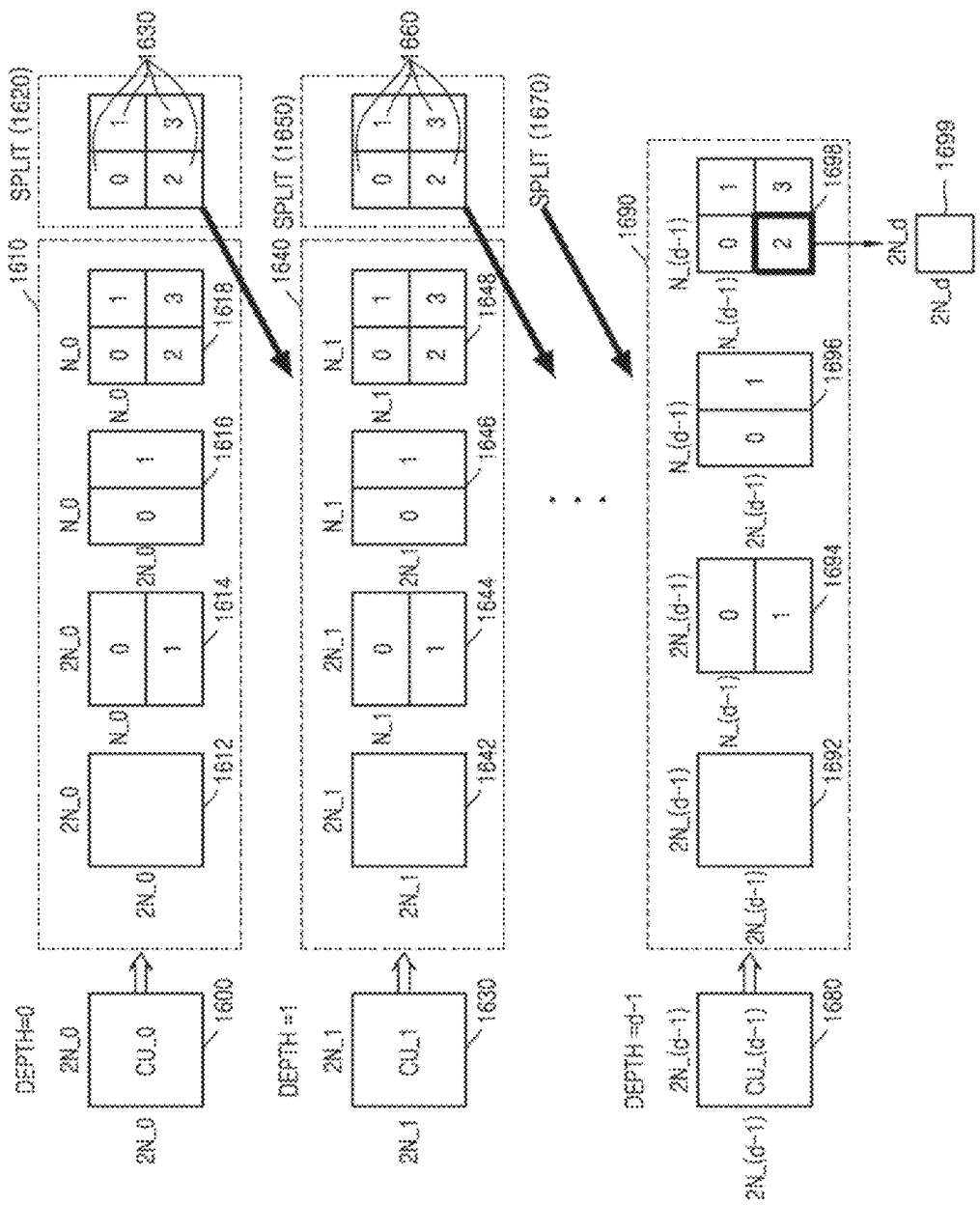
FIG. 16 illustrates coding units, according to an embodiment.

FIG. 16 is a diagram of deeper coding units according to depths, according to various embodiments.

Split information may be used to represent a change in a depth. The spilt information specifies whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Only the partition modes 1612, 1614, 1616, and 1618 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 1612, 1614, and 1616 having the sizes of 2N_0×2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 and split is performed (operation 1620), and encoding may be repeatedly performed on coding units 1630 of a partition mode having a depth of 2 and a size of N_0×N_0 so as to search for a minimum encoding error.

A prediction unit 1640 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having a size of N_1×N_1, a depth is changed from 1 to 2 and split is performed (in operation 1650), and encoding may be repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−. In other words, when encoding is performed up to when the depth is d−1 after a coding unit corresponding to a depth of d−1 is split (in operation 1670), a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition type 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for the coding unit 1652 corresponding to a depth of d−1 is not set.

A data unit 1699 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 800 according to the embodiment may select a depth having the minimum encoding error by comparing encoding errors according to depths of the coding unit 1600 to determine a depth, and set a corresponding partition type and a prediction mode as an encoding mode of the depth.

As such, the minimum encoding errors according to depths are compared in all of the depths of 0, 1, ..., d−1, d, and a depth having the minimum encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 920 of the video decoding apparatus 900 according to the embodiment may extract and use a depth and prediction unit information about the coding unit 1600 so as to decode the coding unit 1612. The video decoding apparatus 900 according to the embodiment may determine a depth, in which split information is '0', as a depth by using split information according to depths, and may use, for decoding, split information about the corresponding depth.

Figure 17:
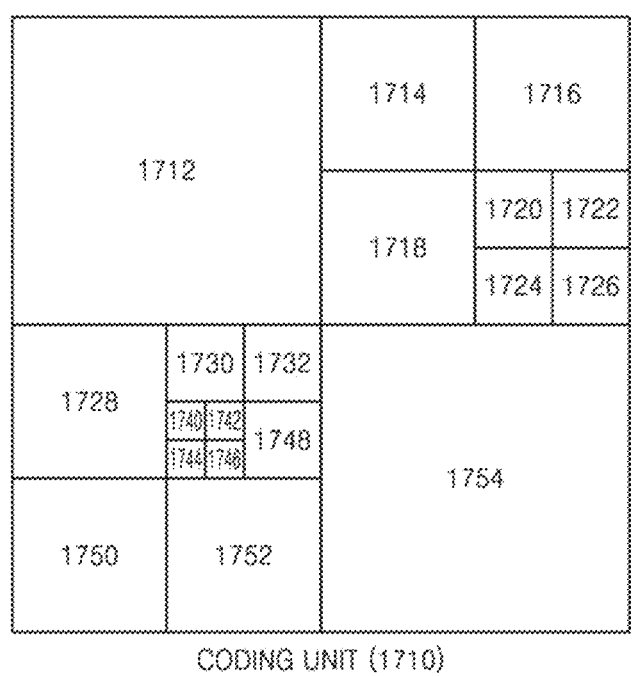
FIGS. 17, 18, and 19 are diagrams for describing a relationship between coding units, prediction units, and transformation units, according to an embodiment.
Figure 18:
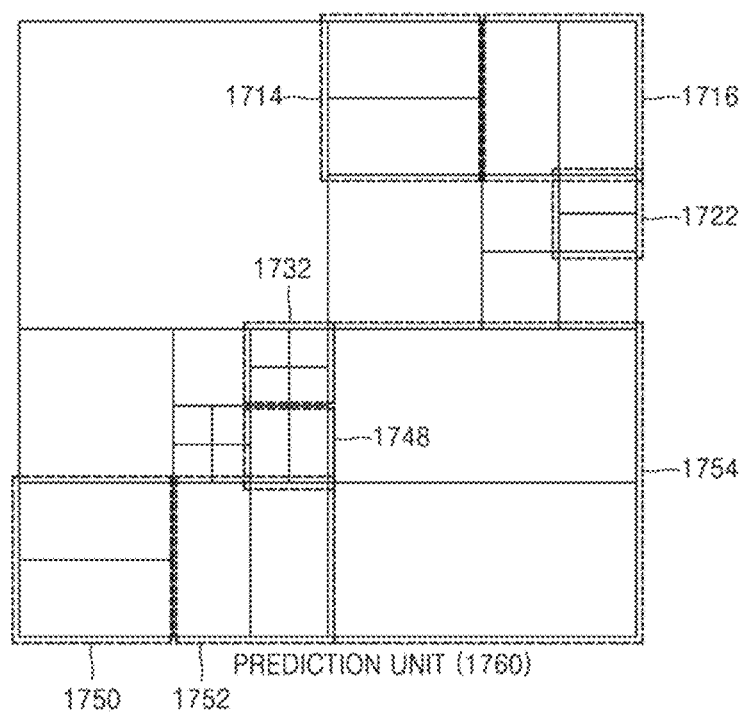
Figure 19:
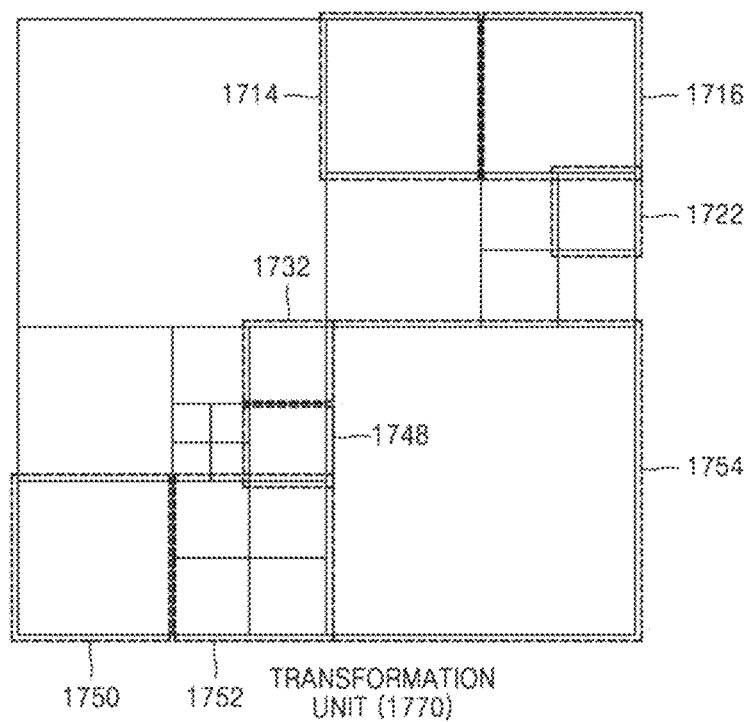

FIGS. 17, 18, and 19 are diagrams for describing a relationship between coding units, prediction units, and transformation units, according to various embodiments.

Coding units 1710 are deeper coding units according to depths determined by the video encoding apparatus 800, in a largest coding unit. Prediction units 1760 are partitions of prediction units of each of the coding units 1710 according to depths, and transformation units 1770 are transformation units of each of the coding units according to depths.

When a depth of a largest coding unit is 0 in the deeper coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1760 are data units different from those in the prediction units 1760 in terms of sizes and shapes. That is, the video encoding apparatus 800 and the video decoding apparatus 900 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 800 and the video decoding apparatus 900 according to the embodiments.

TABLE 1

Split Information 0
(Encoding on Coding Unit having Size of 2N × 2N and Current Depth of d)

| | Partition Type | | Size of Transformation Unit | | |
|---|---|---|---|---|---|
| Prediction Mode | Symmetrical Partition Mode | Asymmetrical Partition Mode | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Mode) N/2 × N/2 (Asymmetrical Partition Mode) | Repeatedly Encode Coding Units having Lower Depth of d + 1 |

The output unit 830 of the video encoding apparatus 800 according to the embodiment may output the encoding information about the coding units having a tree structure, and the image data and encoding information extractor 920 of the video decoding apparatus 900 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to an embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 20:
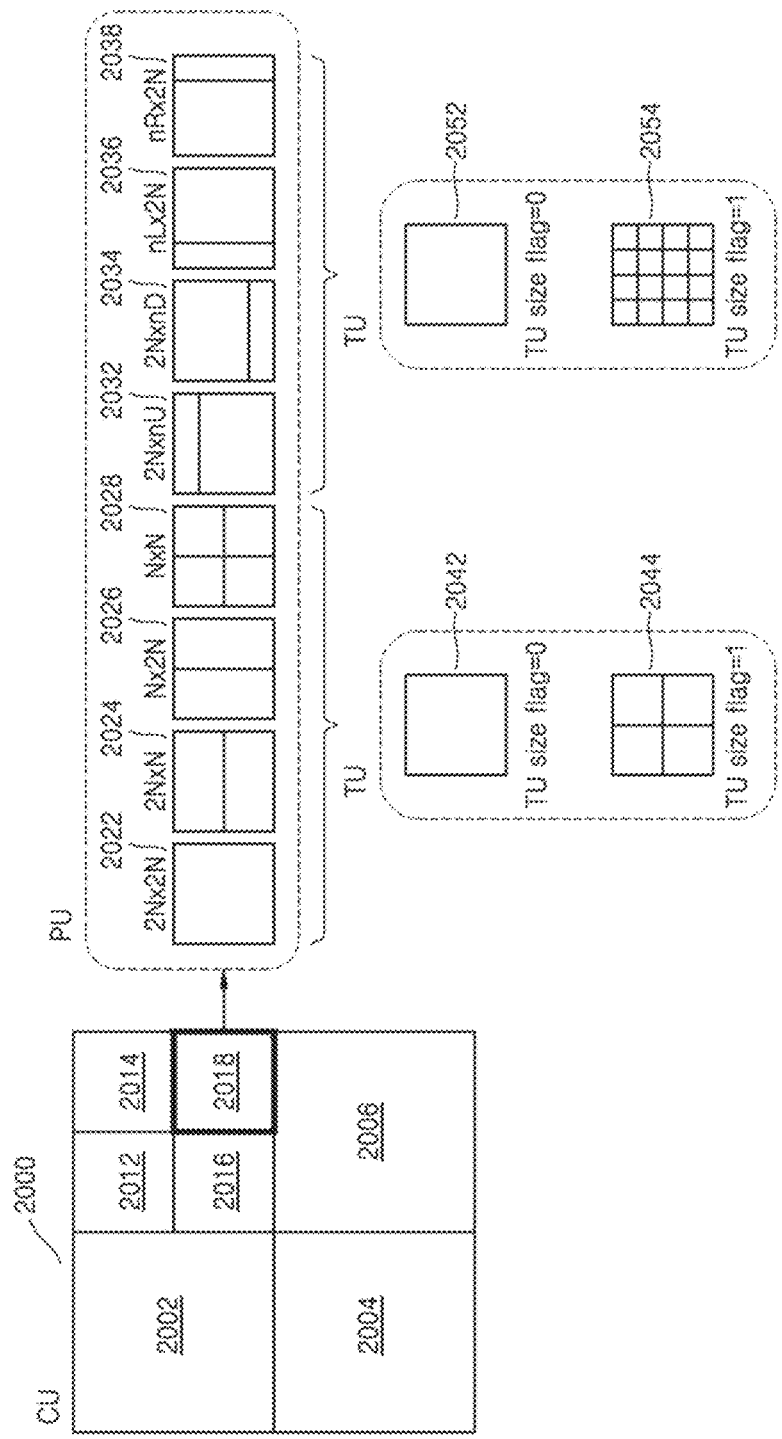
FIG. 20 is a diagram for describing a relationship between a coding unit, a prediction unit, and a transformation unit, according to encoding mode information of Table 1.

FIG. 20 illustrates a relationship between a coding unit, a prediction unit, and a transformation unit, according to encoding mode information of Table 1.

A largest coding unit 2000 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value of 0 or 1, but the transformation unit split information according to an embodiment is not limited to a flag having 1 bit, and the transformation unit may be hierarchically split while the transformation unit split information increases in a manner of 0, 1, 2, 3. etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 800 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$CurrMinTuSize=\max(MinTransformSize, RootTuSize/(2^{\wedge}MaxTransformSizeIndex)) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(Max\ TransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.

For convenience of description, the video encoding method and/or the video encoding method, which are described with reference to FIGS. 1 through 20, will be collectively referred to as 'the video encoding method of the present disclosure'. Also, the video decoding method and/or the video decoding method, which are described with reference to FIGS. 1 through 20, will be collectively referred to as 'the video decoding method of the present disclosure'.

Also, a video encoding apparatus including the video encoding apparatus, the video encoding apparatus 800, or the image encoder 1100 which are described with reference to FIGS. 1 through 20 will be collectively referred as a 'video encoding apparatus'. Also, a video decoding apparatus including the inter-layer video decoding apparatus, the video decoding apparatus 900, or the image decoder 1200 which are described with reference to FIGS. 1 through 20 will be collectively referred to as a 'video decoding apparatus'.

A computer-readable recording medium such as a disc 26000 that stores the programs according to an embodiment will now be described in detail.

Figure 21:
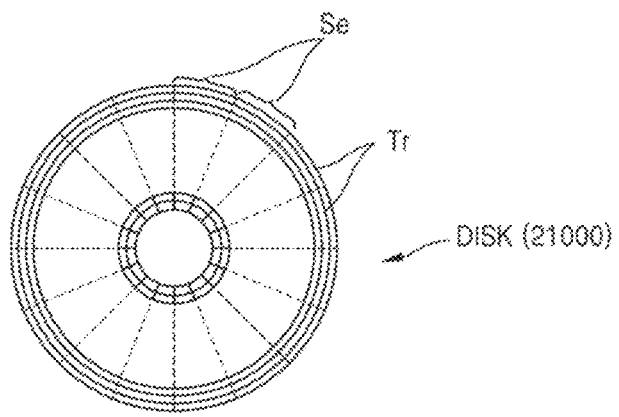
FIG. 21 is a diagram of a physical structure of a disc in which a program is stored, according to an embodiment.

FIG. 21 is a diagram of a physical structure of the disc 26000 in which a program according to various embodiments is stored. The disc 26000, as a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
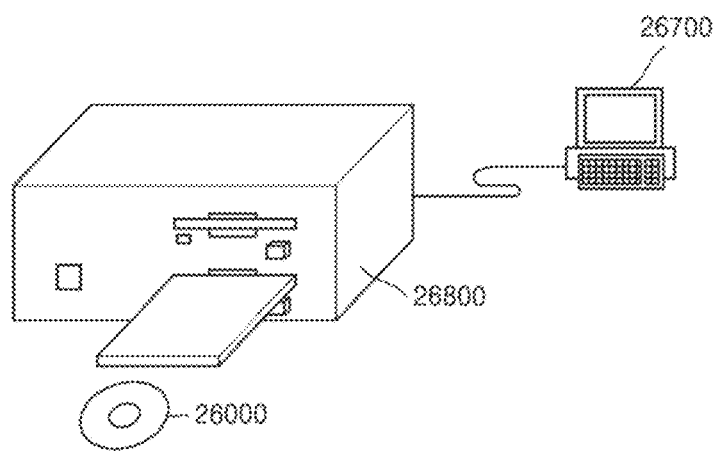
FIG. 22 is a diagram of a disc drive for recording and reading a program by using the disc.

FIG. 22 illustrates a diagram of a disc drive 26800 for recording and reading a program by using the disc 26000. A computer system 26700 may store a program that executes at least one of the video encoding method and the video decoding method of the present disclosure, in the disc 26000 via the disc drive 26800. In order to run the program stored in the disc 26000 in the computer system 26700, the program may be read from the disc 26000 and may be transmitted to the computer system 26700 by using the disc drive 26100.

The program that executes at least one of a video encoding method and a video decoding method according to an embodiment may be stored not only in the disc 26000 illustrated in FIGS. 21 and 22 but also may be stored in a memory card, a ROM cassette, or a solid state drive (SSD).

A system to which the video encoding method and the video decoding method according to the embodiments described above are applied will be described below.

Figure 23:
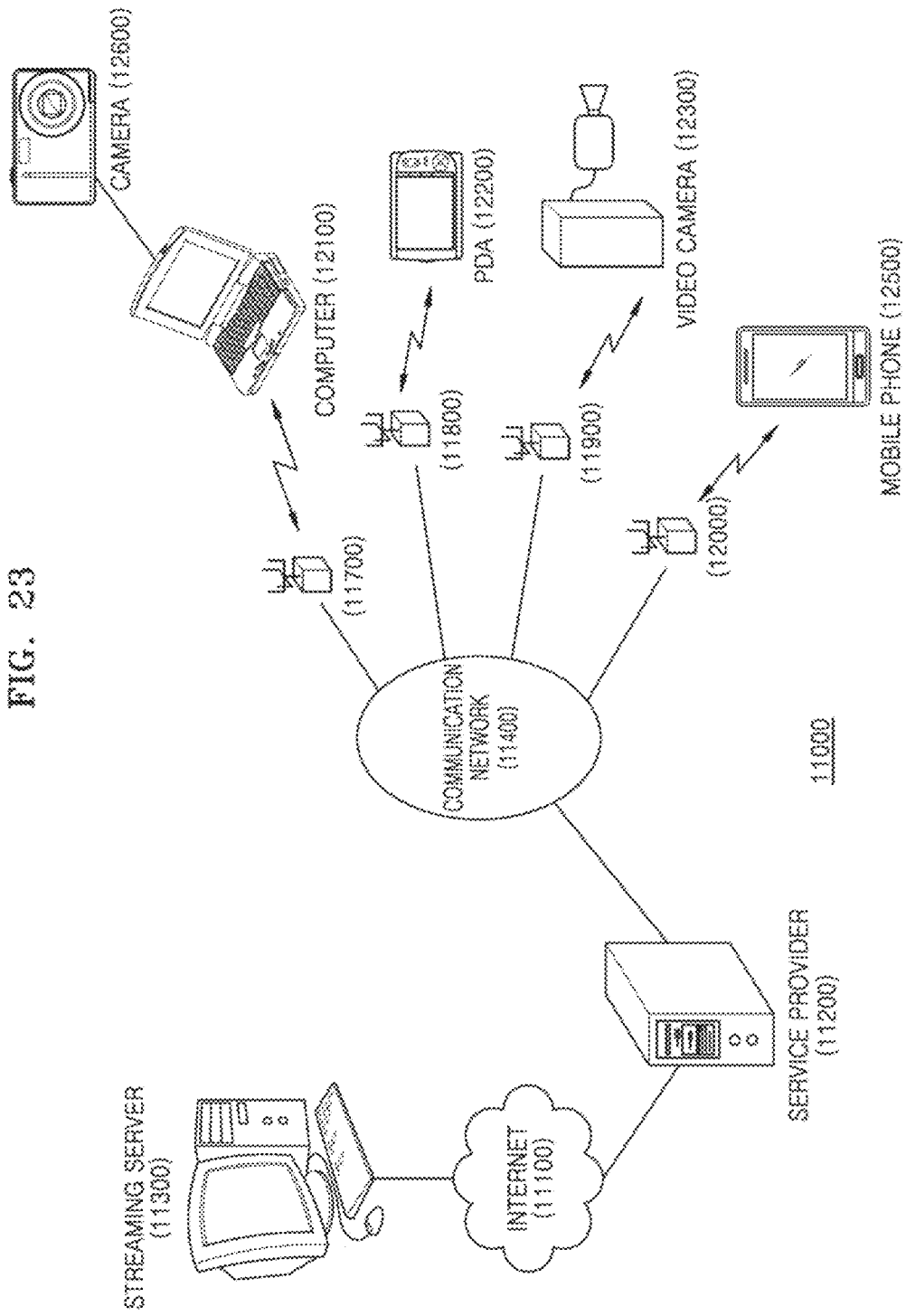
FIG. 23 is a diagram of an overall structure of a content supply system for providing a content distribution service.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to the structure illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded by using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessible by the computer 12100.

If video data is captured by using a camera built in the mobile phone 12500, the video data may be received from the mobile phone 12500.

The video data may be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and may transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present disclosure may be applied to encoding and decoding operations of the plurality of independent devices included in the content supply system 11000.

The mobile phone 12500 included in the content supply system 11000 according to an embodiment will now be described in greater detail with referring to FIGS. 24 and 25.

Figure 24:
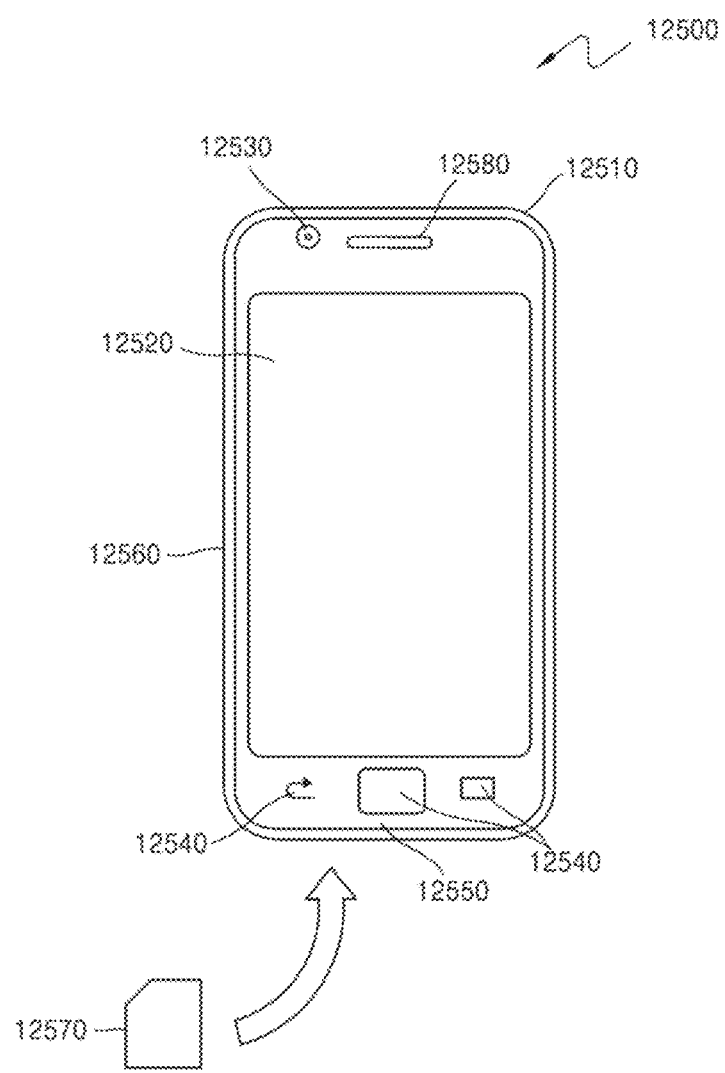
FIGS. 24 and 25 illustrate external and internal structures of a mobile phone to which the video encoding method and the video decoding method of the present disclosure are applied, according to embodiments.

FIG. 24 illustrates an external structure of the mobile phone 12500 to which the video encoding method and the video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
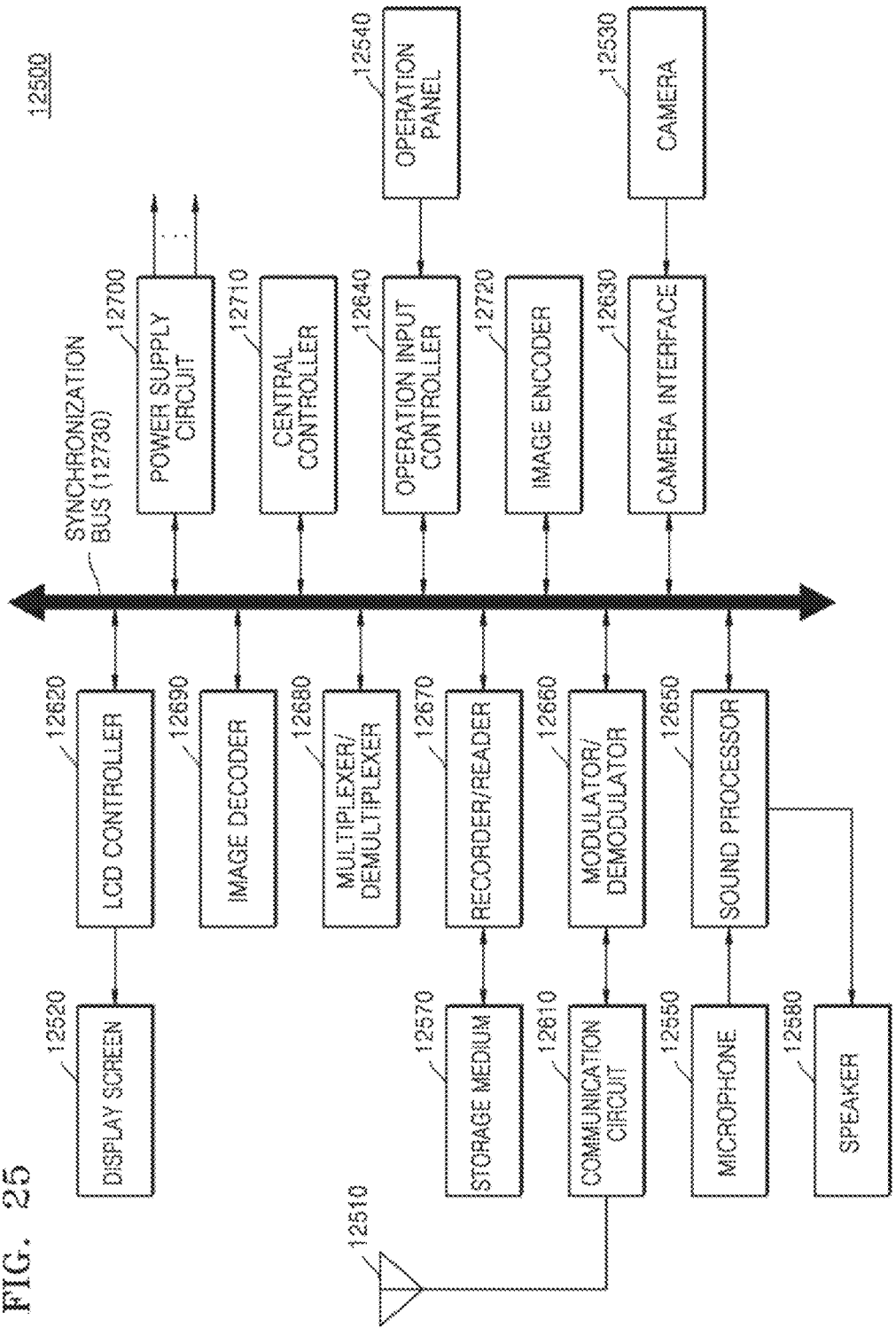

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 by the control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by using the camera 12530 is provided to the image encoder 12720 via the camera interface 12630. The image data captured by using the camera 12530 may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be converted to digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is converted to an analog sound signal via the modulation/demodulation unit 12660 and the sound processor 12650, and the analog sound signal is output via the speaker 12580 by the control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment, may be a transmitting terminal including only the video encoding apparatus, or may be a receiving terminal including only the video decoding apparatus.

Figure 26:
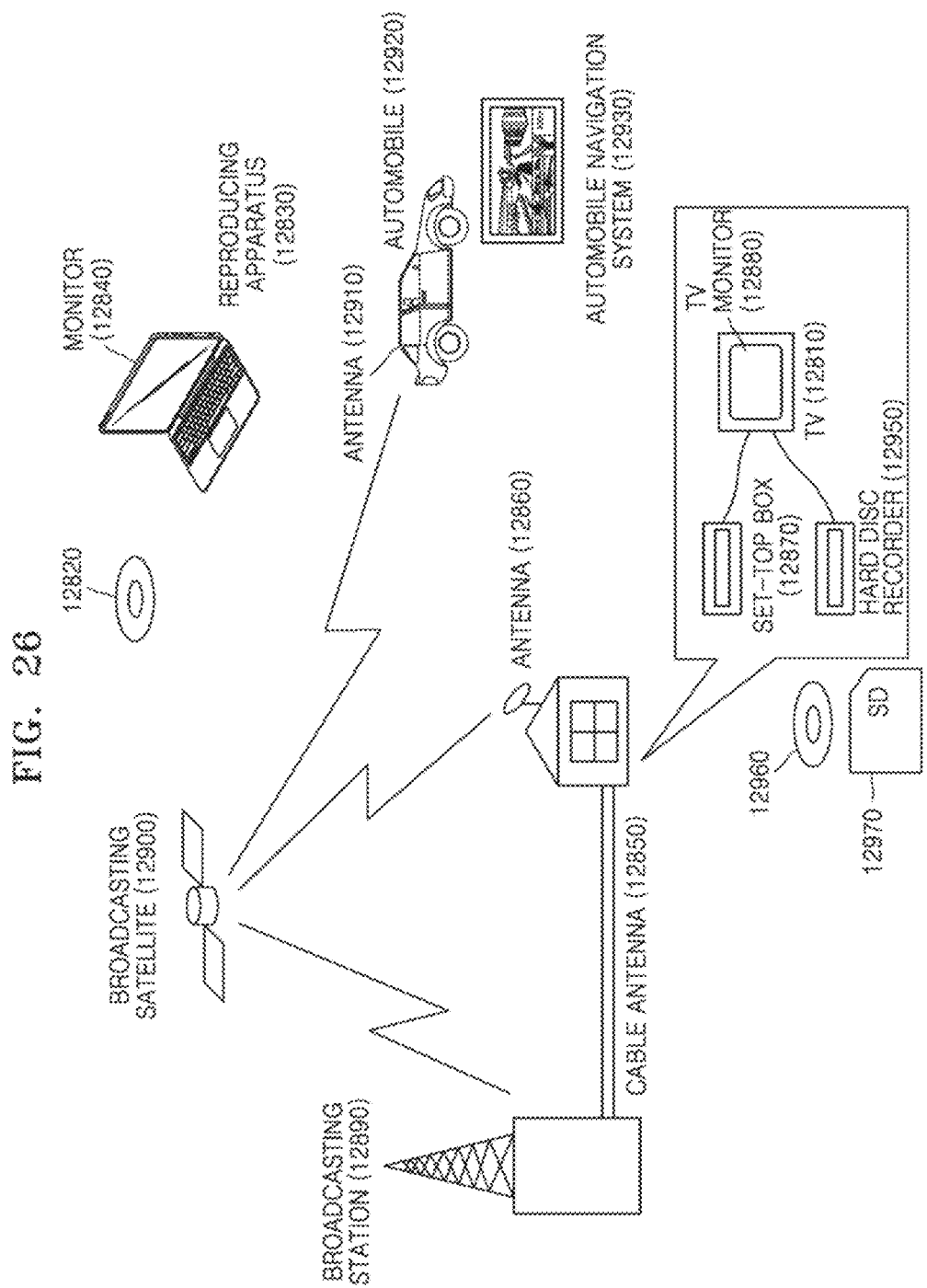
FIG. 26 illustrates a digital broadcasting system employing a communication system, according to an embodiment.

A communication system according to an embodiment is not limited to the communication system described above with reference to FIG. 24. For example, FIG. 26 illustrates a digital broadcasting system employing a communication system, according to various embodiments. The digital broadcasting system of FIG. 26 may receive a digital broadcast transmitted via a satellite or a terrestrial network by using the video encoding apparatus and the video decoding apparatus of the present disclosure.

In more detail, a broadcasting station 12890 transmits a video data stream to a communication satellite or a broadcasting satellite 12200 by using radio waves. The broadcasting satellite 12200 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to the embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12220 that has an appropriate antenna 12210 may receive a signal transmitted from the satellite 12200 or the wireless base station 11700. A decoded video may be reproduced on a display screen of an automobile navigation system 12930 installed in the automobile 12920.

A video signal may be encoded by the video encoding apparatus according to the embodiment and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the embodiment, a video signal recorded on the DVD disc 12960, the SD card 12970, or another storage medium may be reproduced on the TV monitor 12880.

The automobile navigation system 12930 may not include the camera 12530, the camera interface 12630, and the video encoder 12720 of FIG. 26. For example, the computer 12100 and the TV receiver 12810 may not include the camera 12530, the camera interface 12630, and the video encoder 12720 of FIG. 26.

Figure 27:
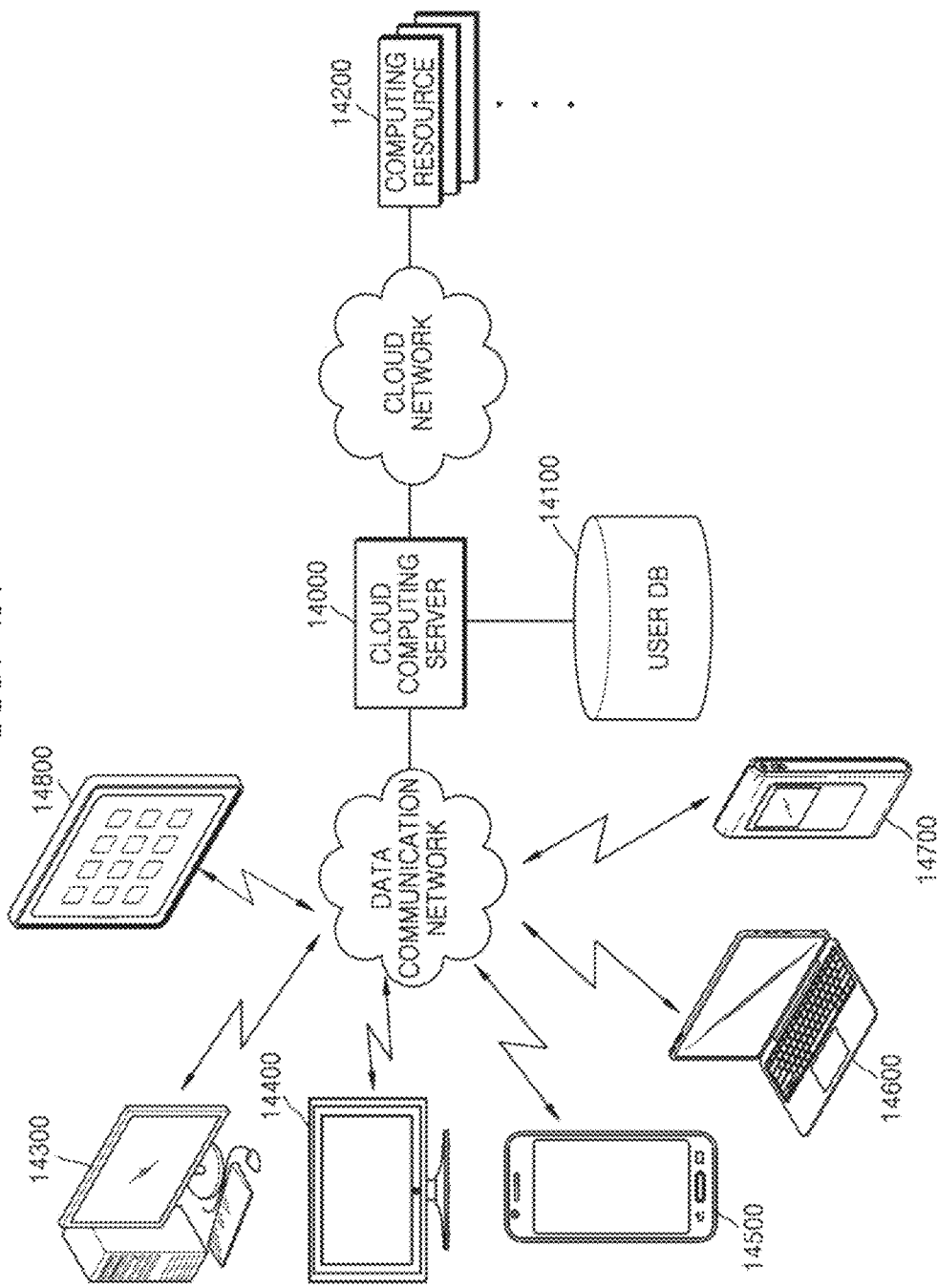
FIG. 27 is a diagram illustrating a network structure of a cloud computing system using the video encoding apparatus and the video decoding apparatus, according to an embodiment.

FIG. 27 illustrates a network structure of a cloud computing system using a video encoding apparatus and a video decoding apparatus, according to various embodiments.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14100, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present disclosure as described above with reference to FIGS. 1 through 20. As another example, the user terminal may include the video encoding apparatus of the present disclosure as described above with reference to FIGS. 1 through 20. Alternatively, the user terminal may include both the video decoding apparatus and the video encoding apparatus of the present disclosure as described above with reference to FIGS. 1 through 20.

Various applications of the video encoding method, the video decoding method, the video encoding apparatus, and the video decoding apparatus according to various embodiments described above with reference to FIGS. 1 through 20 have been described above with reference to FIGS. 21 through 27. However, methods of storing the video encoding method and the video decoding method in a storage medium or methods of implementing the video encoding apparatus and the video decoding apparatus in a device, according to various embodiments, are not limited to the embodiments described above with reference to FIGS. 21 through 27.

The disclosure can also be embodied as computer-readable codes on a non-transitory computer-readable recording medium. The non-transitory computer-readable recording medium is any data storage device that can store data which can be thereafter read by a computer system. Examples of the non-transitory computer-readable recording medium include ROMs, RAMs, CD-ROMs, magnetic tapes, floppy disks, optical data storage devices, etc. The non-transitory computer-readable recording medium can also be distributed over network coupled computer systems so that the computer-readable code is stored and executed in a distributed fashion.

While this disclosure has been particularly shown and described with reference to embodiments thereof, it will be understood by one of ordinary skill in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

The invention claimed is:

1. A video decoding method performed by a video decoding apparatus, the video decoding method comprising:
   obtaining, from a bitstream, a skip mode flag indicating whether a current block is predicted in a skip mode;
   in response to the skip mode flag indicating that the current block is not predicted in the skip mode, obtaining a merge mode flag for a the current block from athe bitstream;
   in response to determining whether the merge mode flag indicates that the current block is predicted in a merge mode or not, obtaining motion vector prediction mode information of the current block, from the bitstream;
   when the motion vector prediction mode information of the current block indicates a pre-set prediction mode, obtaining, from the bitstream, information indicating a signed direction of a motion vector difference, information indicating a pixel distance of the motion vector difference, and a first index indicating a first motion vector candidate from a first candidate list, wherein the first candidate list including motion vectors of blocks adjacent to the current block, determining the first motion vector candidate indicated by the first index from the first candidate list, determining the motion vector difference based on the signed direction of the motion vector difference and the pixel distance of the motion vector difference, and determining a motion vector of the current block based on the first motion vector candidate and the motion vector difference;
   when the motion vector prediction mode information of the current block does not indicate the pre-set prediction mode, obtaining, from the bitstream, a second index indicating a second motion vector candidate from a second candidate list, determining the second motion vector candidate indicated by the second index from the second candidate list, and determining the motion vector of the current block based on the second motion vector candidate;
   obtaining a residual block of the current block by performing inverse transformation on transformation coefficients of the current block; and
   determining a reconstructed block of the current block by using the residual block and a prediction block indicated by the motion vector,
   wherein the signed direction is one of a horizontal component of a positive sign, a horizontal component of a negative sign, a vertical component of the positive sign and a vertical component of the negative sign, and the pixel distance comprises a sub-pel unit and an integer-pel unit.

2. A video encoding method performed by a video encoding apparatus, the video encoding method comprising:
   generating a skip mode flag indicating whether a current block is predicted in a skip mode,
   when the current block is not predicted in the skip mode, generating a merge mode flag for the current block to indicate whether the current block is predicted in a merge mode or not;
   based on whether the current block is predicted in the merge mode or not, generating motion vector prediction mode information of the current block indicating whether the current block is predicted in a pre-set prediction mode;
   when the current block is predicted in the pre-set prediction mode, determining a motion vector of the current block, determining a first candidate list including motion vectors of blocks adjacent to the current block, determining a first motion vector candidate from the first candidate list, determining a motion vector difference between the first motion vector candidate and the motion vector of the current block, and generating information indicating a signed direction of the motion vector difference, information indicating a pixel distance of the motion vector difference, and a first index indicating the first motion vector candidate from the first candidate list;

when the current block is not predicted in the pre-set prediction mode, determining the motion vector of the current block, determining a second candidate list including the motion vectors of blocks adjacent to the current block, determine a second motion vector candidate from the second candidate list, and generating a second index indicating the second motion vector candidate from the second candidate list;

obtaining a residual block of the current block between the current block and a prediction block corresponding to the motion vector of the current block; and generating transform coefficients of the residual block by performing transformation on the residual block of the current block, wherein the signed direction is one of a horizontal component of a positive sign, a horizontal component of a negative sign, a vertical component of the positive sign and a vertical component of the negative sign, and the pixel distance comprises a sub-pel unit and an integer-pel unit.

3. A method of transmitting a bitstream generated by a video encoding apparatus, the method comprising:

generating a skip mode flag indicating whether a current block is predicted in a skip mode, when the current block is not predicted in the skip mode, generating a merge mode flag for the current block to indicate whether the current block is predicted in a merge mode or not;

based on whether the current block is predicted in the merge mode or not, generating motion vector prediction mode information of the current block indicating whether the current block is predicted in a pre-set prediction mode;

when the current block is predicted in the pre-set prediction mode, determining a motion vector of the current block, determining a first candidate list including motion vectors of blocks adjacent to the current block, determining a first motion vector candidate from the first candidate list, determining a motion vector difference between the first motion vector candidate and the motion vector of the current block, and generating information indicating a signed direction of the motion vector difference, information indicating a pixel distance of the motion vector difference, and a first index indicating the first motion vector candidate from the first candidate list;

when the current block is not predicted in the pre-set prediction mode, determining the motion vector of the current block, determining a second candidate list including the motion vectors of blocks adjacent to the current block, determine a second motion vector candidate from the second candidate list, and generating a second index indicating the second motion vector candidate from the second candidate list;

obtaining a residual block of the current block between the current block and a prediction block corresponding to the motion vector of the current block;

encoding transform coefficients of the residual block, the transform coefficients generated by performing transformation on the residual block of the current block; and outputting the bitstream including the skip mode flag, the merge mode flag, the motion vector prediction mode information and the encoded transform coefficients, wherein the signed direction is one of a horizontal component of a positive sign, a horizontal component of a negative sign, a vertical component of the positive sign and a vertical component of the negative sign, and the pixel distance comprises a sub-pel unit and an integer-pel unit.

* * * * *